US008762694B1

(12) United States Patent
Zou et al.

(10) Patent No.: US 8,762,694 B1
(45) Date of Patent: Jun. 24, 2014

(54) PROGRAMMABLE EVENT-DRIVEN YIELD MECHANISM

(75) Inventors: Xiang Zou, Beaverton, OR (US); Hong Wang, Fremont, CA (US); Robert Knight, Mahomet, IL (US); Robert Geva, Cupertino, CA (US); Gautham Chinya, Hillsboro, OR (US); Scott Dion Rodgers, Beaverton, OR (US); Chris Newburn, South Beloit, IL (US); Bryant E. Bigbee, Scottsdale, AZ (US); Per Hammarlund, Hillsboro, OR (US); Ittai Anati, Haifa (IL); Jim B. Crossland, Banks, OR (US); John P. Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/395,884

(22) Filed: Mar. 31, 2006

Related U.S. Application Data

(63) Continuation-in-part of application No. 11/134,687, filed on May 19, 2005, now Pat. No. 7,849,465, which is a continuation-in-part of application No. 10/370,251, filed on Feb. 19, 2003, now Pat. No. 7,487,502.

(51) Int. Cl.
*G06F 9/48* (2006.01)

(52) U.S. Cl.
USPC .......................................................... 712/244

(58) Field of Classification Search
CPC ........................................................ G06F 9/48
USPC .......................................................... 712/244
See application file for complete search history.

(56) References Cited

U.S. PATENT DOCUMENTS

| 4,594,660 | A  | * | 6/1986  | Guenthner et al. | 712/23  |
| 5,594,905 | A  | * | 1/1997  | Mital            | 710/260 |
| 6,493,741 | B1 |   | 12/2002 | Emer et al.      |         |
| 6,708,326 | B1 | * | 3/2004  | Bhattacarya      | 717/124 |
| 7,020,766 | B1 |   | 3/2006  | Wang et al.      |         |

OTHER PUBLICATIONS

Konrad et al—U.S. Appl. No. 11/331,874, filed Jan. 13, 2006—Processing Essential and Non-Essential Code Separately.
Zilles et al—Time-Shifted Modules: Exploiting Code Modularity for Fine Grain Parallelization—University of Wisconsin Technical Report—21 Pages.
Marr et al—Hyper-Threading Technology Architecture and Microarchitecture—12 Pages.

(Continued)

*Primary Examiner* — Robert Fennema
*Assistant Examiner* — John Lindlof
(74) *Attorney, Agent, or Firm* — Blakely, Sokoloff, Taylor & Zafman LLP

(57) ABSTRACT

Method, apparatus, and system for a programmable event-driven yield mechanism. The mechanism may disrupt processing of a program to deliver a yield event. The event may be treated as a fault-like yield event or a trap-like event. For a fault-like yield event, the faulting instruction is canceled before retirement and processor state is not updated before the yield event is delivered. For a trap-like yield event the instruction causing the trap is retired and the yield event is delivered on an interrupt boundary. Multiple pending yield events may be handled according to priority. Other embodiments are also described and claimed.

26 Claims, 13 Drawing Sheets

(56) References Cited

OTHER PUBLICATIONS

El-Moursy et al—Front-End Policies for Improved Issue Efficiency in SMT Processors—Department of Electrical and Computer Engineering University of Rochester—10 Pages.
Kessler—The Alpha 21264 Microprocessor—IEEE Micro, vol. 19, Iss. 2, Mar.-Apr. 1999, pp. 4-11.
Lewandowski—Intel X86 Assembly and Debugging Support—CS295-2: Advanced Topics in Debugging—Sep. 21, 1998—47 Pages.
Srinivasan et al—Load Latency Tolerance in Dynamically Scheduled Processors—Oct. 1999—24 Pages.
Olukotin et al—The Case for a Single-Chip Multiprocessor—Computer Systems Laboratory Stanford University—10 Pages.
Sundaramoorthy et al—Slipstream Processors: Improving Both Performance and Fault Tolerance—North Carolina State University Department of Electrical and Computer Engineering—pp. 257-268.
Dubois et al—Assisted Execution—Ceng Technical Report 98-25—Department of Electrical Engineering Systems—University of Southern California—Oct. 1998—25 Pages.
Sharangpani et al—Itanium Processor Microarchitecture—Sep./Oct. 2000—pp. 24-43.
Roth et al—Speculative Data-Driven Multithreading—Computer Sciences Department, University of Wisconsin-Madison—Jan. 22-24, 2001—12 Pages.
Roth et al—Dependence Based Prefetching for Linked Data Structures—Computer Sciences Department University of Wisconsin-Madison—pp. 115-126.
Kim et al—Implementing Stack Simulation for Highly-Associative Memories—Computer Sciences Dept. 2 Pages.
Joseph et al—Prefetching Using Markov Predictors—pp. 252-263.
Huck et al—Introducing the IA-64 Architecture—Sep. / Oct. 2000—pp. 12-23.
Krishnaiyer et al—An Advanced Optimizer for the IA-64 Architecture—Nov./Dec. 2000—pp. 60-68.
Bharadwaj et al—The Intel IA-64 Compiler Code Generator—Sep./Oct. 2000—pp. 44-53.
Emer—Simultaneous Multithreading: Multiplying Alpha Performance—Compaq Computer Corporation—23 Pages.
Chappell et al—Simultaneous Subordinate Microthreading (SSMT)—1999—pp. 186-195.
Carlisle—Olden: Parallelizing Programs With Dynamic Data Structures on Distributed-Memory Machines—A Dissertation Presented to the Faculty of Princeton University in Candidacy for the Degree of Doctor of Philosophy—Jun. 1996—pp. 1-117.
Santosh et al—Predicting Load Latencies Using Cache Profiling—Compiler and Architecture Research HPL-94-110—Nov. 1994—42 Pages.
Tullsen—Simulation and Modeling of a Simultaneous Multithreading Processor—Department of Computer Science and Engineering University of California, San Diego—CMG96 Proceedings vol. 2—Dec. 8-13, 1996—pp. 819-828.
Tullsen et al—Exploiting Choice: Instruction Fetch and Issue on a Implementable Simultaneous Multithreading Processor—pp. 191-202.
Tullsen et al—Simultaneous Multithreading: Maximizing On-Chip Parellelism—Department of Computer Science and Engineering University of Washington—pp. 392-403.
Uhlig et al—SOFTSDV: A Presilicon Software Development Environment for the IA-64 Architecture—pp. 1-14.
Wallace et al—Threaded Multiple Path Execution—Department of Computer Science and Engineering University of California, San Diego—1998—pp. 238-249.
Young et al—A Comparatuve Analysis of Schemes for Correlated Branch Prediction—Division of Applied Sciences Harvard University—pp. 276-286.
Zilles et al—Understanding the Backward Slices of Performance Degrading Instructions—Computer Sciences Department, University of Wisconsin-Madison—10 Pages.
Collins et al—Speculative Precomputation: Long-Range Prefetching of Delinquent Loads—Department of Computer Science University of Illinois at Urbana-Champaign—2001—pp. 14-25.
Dundas et al—Improving Data Cache Performance by Pre-Executing Instructions Under a Cache Miss—Department of Electrical Engineering and Computer Science the University of Michigan—pp. 68-75.
Farrens et al—A Comparison of Superscalar and Decoupled Access/Execute Architectures—Department of Computer Science University of California-Davis—1993—pp. 100-103.
Henning—Spec CPU2000: Measuring CPU Performance in HTE New Millennium—Jul. 2000—8 Pages.
Hinton et al—The Microarchitecture of the Pentium 4 Processor—2001—pp. 1-13.
Palacharla et al—Complexity-Effective Superscalar Processors—1997—pp. 206-218.
Roth et al—Microarchitectural Miss/Execute Decoupling—Computer Science Department University of Wisconsin-Madison—6 Pages.
Sharangpani et al—Itanium Processor Microarchitecture—Sep./Oct. 2000—pp. 24-43.
Smith—Decoupled Access/Execute Computer Architectures—University of Wisconsin—Nov. 1984—pp. 289-308.
Wang et al—Register Renaming and Scheduling for Dynamic Execution of Predicated Code—Microprocessor Research Labs Intel Corp—2001—pp. 15-25.
Asmodt et al—The Predictability of Computations That Produce Unpredictable Outcomes—Department of Electrical and Computer Engineering University of Toronto—pp. 1-11.
Annavaram et al—Data Prefetching by Dependence Graph Precomputation—Electrical Engineering and Computer Science Department the University of Michigan Ann Arbor—2001—pp. 52-61.
Agrawal et al—Dynamic Program Slicing—Conference on Programming Language Design and Implementation—Jun. 20-22, 1990—pp. 246-256.
Cooper et al—An Experimental Evaluation of List Scheduling—Department of Computer Scienc Rice University—15 Pages.
Ghiya et al—On the Importance of Points-To Analysis and Other Memory Disambiguation Methods for C Programs—pp. 47-58.
Goldberg et al—A New Approach to the Maximum-Flow Problem—Oct. 1988—pp. 921-940.
Gupta et al—Hybrid Slicing: An Approach for Refining Static Slices Using Dynamic Information—Dept. of Computer Science University of Pittsburgh—1995—pp. 29-40.
Hinton et al—Intel's Multi-Threading Thechnology—51 Pages.
Landi et al—A Safe Approximate Algorithm for Interprocedural Pointer Aliasing—Department of Computer Science—1992—pp. 235-248.
Liao—SUIF Explorer: An Interactive and Interprocedural Parallelizer—Technical Report No. CSL-TR-00-807—Aug. 2000—pp. 1-146.
Liao et al—SUIF Explorer: An Interactive and Interprocedural Parallelizer—Computer Systems Laboratory Stanford University—1999—pp. 37-48.
Luk—Tolerating Memory Latency Through Software-Comtrolled Pre-Execution in Simultaneous Multithreading Processors—VSSAD/Alpha Development Group Compaq Computer Corporation—2001—pp. 40-51.
Moshovos et al—Slice-Processors: An Implementation of Operation-Based Prediction—2001—pp. 321-334.
Wang et al—Speculative Precomputation: Exploring the Use of Multithreading for Latency—pp. 1-14.
Wang et al—Memory Latency-Tolerance Approaches for Itanium Processors: Out-of-Order Execution vs. Speculative Precomputation—2002 10 Pages.
Weiser—Program Slicing—Jul. 1984 IEEE vol. SE-10, No. 4—pp. 352-357.
Zilles et al—Understanding the Backward Slices of Performance Degrading Instructions—Computer Sciences Department University of Wisconsin-Madison—10 Pages.

(56) References Cited

OTHER PUBLICATIONS

Ziles et al—Execution-Based Prediction Using Speculative Slices—2001 IEEE—Computer Sciences Dept. Univ. of Wisc.-Madison—pp. 2-13.
Aamodt et al—Hardware Support for Prescient Instruction Prefetch—Feb. 2004—9 Pages.
Agarwal et al—April: A Processor Architecture OFR Multiprocessing—1990 IEEE—pp. 104-114.
Annavaram et al—Data Prefetching by Dependence Graph Precomputation—2001 IEEE—pp. 52-61.
Borkenhagen et al—A Multithreaded Powerpc Processor for Commercial Servers—2000 IBM—pp. 885-898.
Chappell et al—Simultaneous Subordinate Microthreading (SSMT)—1999 IEEE—pp. 186-195.
Chappell et al—Difficult-Path Branch Prediction Using Subordinate Microthreads—2002 IEEE—pp. 307-317.
Collins et al—Dynamic Speculative Precomputation—2001 IEEE—pp. 306-317.
Eickemeyer et al—Evaluation of Multithreaded Processors and Thread-Switch Policies—pp. 75-90.
Farrens et al—Strategies for Achieving Improved Processor Throughput—1991—pp. 362-369.
Haskins, Jr. et al—Inexpensive Throughput Enhancement in Small-Scale Embedded Microprocessors With Block Multithreading: Extensions, Characterization, and Tradeoffs—2001 IEEE—pp. 319-328.
Kim et al—Physical Experimentation With Prefetching Helper Threads on Intel's Hyper-Threaded Processors—Proceeding of the International Symposium on Code Generation and Optimization 2004 IEEE—12 Pages.
Kim et al—Design and Evaluation of Compiler Algorithms for Pre-Execution—Department of Electrical and Computer Engineering Institute for Advanced Computer Studies University of Maryland at College Park—pp. 159-170.
Liao et al—Post-Pass Binary Adaptation for Software-Based Speculative Precomputation—PLDI'02, Jun. 17-19, 2002—Berlin, Germany—pp. 117-128.
Mowry et al—Comparative Evaluation of Latency Tolerance Techniques for Software Distributed Shared Memory—12 Pages.
Mowry et al—Design and Evaluation of a Compiler Algorithm for Prefetching—Computer Systems Laboratory Stanford University—Oct. 1992—pp. 62-73.
Mutlu et al—Runahead Execution: An Alternative to Very Large Instruction Windows for Out-of-Order Processors—Proceedings of the Ninth International Symposium on High-Performance Computer Architecture (HPCA Sep. 2003)—2002—12 Pages.
Panait et al—Static Identification of Delinquent Loads—Proceedings of the International Symposium on Code Generation and Optimization (CGO'04)—2004—12 Pages.
Redstone et al—Mini-Threads: Increasing TLP on Small-Scale SMT Processors—Proceedings of the Ninth Symposium on High-Performance Computer Architecture (HPCA-Sep. 2003)—2002—12 Pgs.
Tullsen et al—Supporting Fine-Grained Synchronization on a Simultaneous Multithreading Processor—5 Pages.
Waldspurger et al—Register Relocation: Flexible Contexts for Multithreading—MIT Laboratory for Computer Science—1993 IEEE—pp. 120-130.

\* cited by examiner

PROGRAMMABLE EVENT-DRIVEN YIELD MECHANISM

This patent application is a continuation-in-part of application Ser. No. 11/134,687, filed on May 19, 2005, now U.S. Pat. No. 7,849,465 which is a continuation-in-part of application Ser. No. 10/370,251, filed on Feb. 19, 2003 now U.S. Pat. No. 7,847,502.

BACKGROUND

1. Field

The present disclosure pertains to the field of processing apparatuses and systems that process sequences of instructions or the like, and more particularly to flow of control in a processing system.

2. Description of Related Art

Various mechanisms are presently used to change the flow of control (i.e., the processing path or instruction sequence being followed) in a processing system. For example, a jump instruction in a program sequence explicitly and precisely causes a jump to a new address. The jump instruction is an example of an explicit change of the control flow because the instruction directs the processor to jump to a location and continue executing at that point. A traditional jump instruction is "precise" (or synchronous) because the jump occurs as a direct result of execution of the jump instruction.

Another traditional example of a change in the flow of control is an interrupt. An interrupt may be an external signal provided to an apparatus such as a processor. The processor may respond by jumping to an interrupt handler, a routine that handles the event(s) signaled by a particular interrupt. Interrupts are typically also relatively precise in that they are recognized and acted upon by a processor within a particular window of time in relation to their receipt. In particular, interrupts are often serviced at the next instruction boundary after they are received internally. In some cases, only the operating system or other software operating at a high privilege level is allowed to mask interrupts, so a user program may have no opportunity to enable or disable these control flow changing events.

Another traditional example of a change in the flow of control occurs in response to an exception. An exception typically reflects a predefined architectural condition such as a result of a mathematical instruction meeting certain criteria (denormal, underflow, overflow, not a number, etc.). Some exceptions can be masked, for example, by setting a bit in a control register. If an exception occurs and is not masked, then an exception handler is called to handle the exception.

Another technique that changes the flow of control of a processor is the use of breakpoints. Breakpoints are typically used in debugging. A particular instruction address may be programmed into a breakpoint register. The processor may do various acts (other than continue with the program as usual) when a breakpoint is active and the target address is reached. Breakpoints allow single-stepping through a program, among other things.

Multi-threading is a technique by which processor hardware may be utilized by multiple different threads. Multi-threaded processors may switch between threads for a variety of reasons. For example, a processor may have an algorithm that automatically switches between available threads. Other processors use switch-on-event multithreading (SoEMT), whereby certain events such as a cache miss may give rise to a thread switch. Thread switching can be considered a change of control flow because the processor switches the sequence or stream which it executes.

In one prior art reference, a quiesce instruction is detailed (see U.S. Pat. No. 6,493,741). In one example, the quiesce instruction stops processing in one thread until either a timer expires or a write to a memory location occurs. Therefore, an instruction such as the quiesce instruction may itself trigger the temporary cessation of processing of the thread containing the quiesce instruction and a switch to another thread.

BRIEF DESCRIPTION OF THE FIGURES

The present invention is illustrated by way of example and not limitation in the Figures of the accompanying drawings.

DETAILED DESCRIPTION

The following description describes embodiments of a programmable event-driven yield mechanism responsive to detection of one or more user-selected architecturally-defined processor conditions. In the following description, numerous specific details such as processor types, microarchitectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

In some embodiments, disclosed techniques may allow a program to actively monitor and respond to conditions of the execution resources while executing the program. Effectively, such embodiments may incorporate real-time execution resource operating condition feedback to improve performance. If the execution resources encounter execution delaying conditions, the program execution may be disrupted to make adjustments. In some embodiments, a handler may be activated and may spawn a service thread to attempt to improve execution of the original thread. In other embodiments, the disruption may be accomplished by switching to another program thread that may not be a service thread. These and other embodiments may in some cases advantageously improve processing throughput and/or allow optimizations to be tailored to particular hardware.

Figure 1:
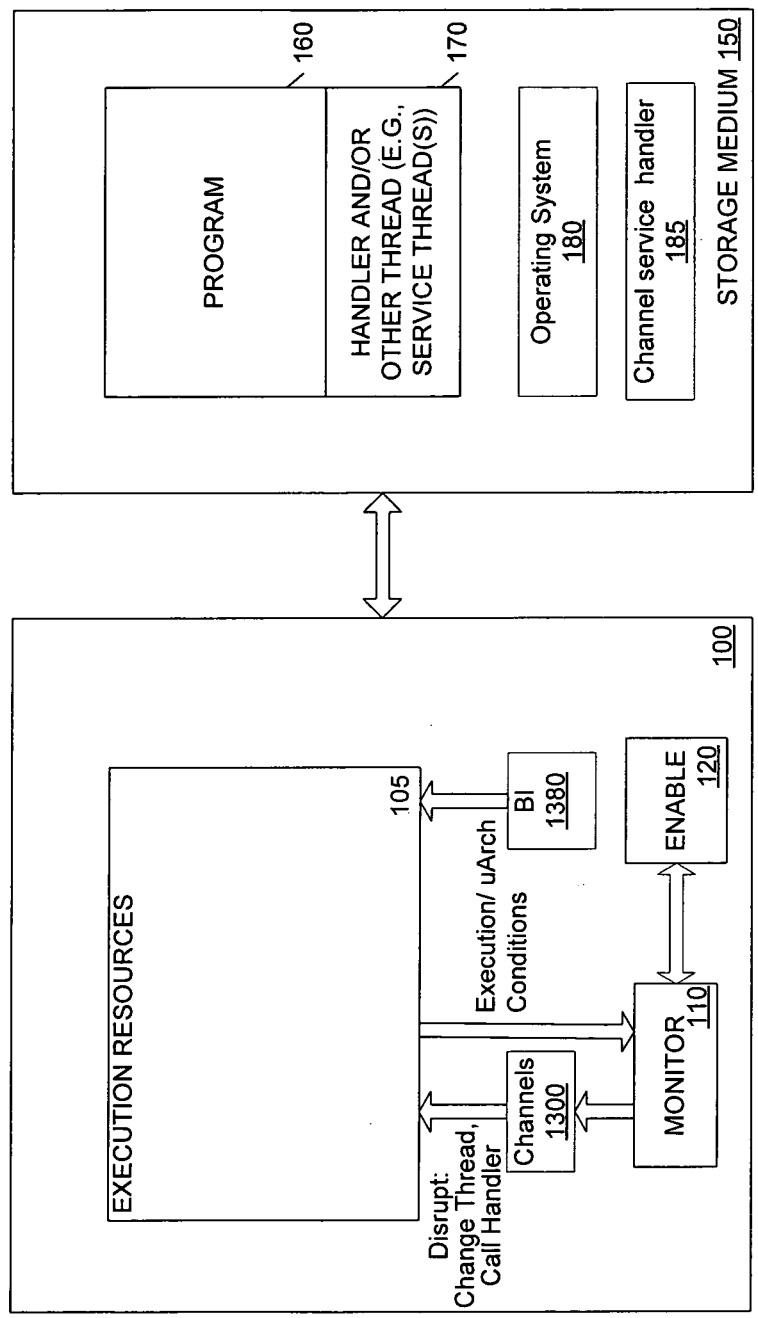
FIG. 1 illustrates one embodiment of a system that can detect and respond to processing conditions of execution resources.

Turning to FIG. 1, one embodiment of a system that can detect and respond to processing conditions of execution resources is illustrated. In the embodiment of FIG. 1, execution resources 105, a monitor 110, and enable logic 120 form a portion of a processor 100 that is capable of executing instructions. The execution resources may include hardware resources that may be integrated into a single component or integrated circuit in some embodiments. However the execution resources may include software or firmware resources or any combination of hardware and software and/or firmware that may also be used in execution of program instructions. For example, firmware may be used as a part of an abstraction layer or may add functions to processing hardware, as may software. Software also may be used to emulate part or all of an instruction set or to otherwise assist in processing.

The processor may be any of a variety of different types of processors that execute instructions. For example, the processor may be a general purpose processor such as a processor in the Pentium® Processor Family or the Itanium® Processor Family or other processor families from Intel Corporation or other processors from other companies. Thus, the processor may be a reduced instruction set computing (RISC) processor, a complex instruction set computing (CISC) processor, a very long instruction word (VLIW) processor, or any hybrid or alternative processor type. Moreover, special purpose processors such as network or communication processors, co-processors, embedded processors, compression engines, graphics processors, etc., may use disclosed techniques. As integration trends continue and processors become even more complex, the need to monitor and react to internal performance indicators may further increase, thus making presently disclosed techniques more desirable. However, due to rapid technological advance in this area of technology, it is difficult to foresee all the applications of disclosed technology, though they may be widespread for complex hardware that executes program sequences.

As shown in FIG. 1, the processor 100 is coupled to a storage medium 150 such as a memory. The storage medium 150 may be a memory subsystem having various levels of hierarchy which may include but are not limited to various levels of cache memory, system memory such as dynamic random access memory or the like, and non-volatile storage such as flash memory (e.g. memory stick etc), a magnetic or optical disk. As illustrated, the storage medium stores a program 160 and a handler and/or other thread instructions such as instructions for a service thread 170.

To allow the monitor 110 to monitor the desired events, the monitor 110 may be coupled to various portions of execution resources in order to detect particular conditions or to be informed of certain microarchitectural events. Signal lines may be routed to the monitor 110, or the monitor may be strategically placed with or integrated with relevant resources. The monitor 110 may include various programmable logic or software or firmware elements. For at least one embodiment, the monitor 110 may be programmed to monitor for one or more architectural or microarchitectural events that are associated with architecturally defined "scenarios" that may be used to trigger a yield event. Alternatively, the monitor 110 may be hardwired to detect a particular condition or set of conditions associated with a "scenario".

Accordingly, the system illustrated in FIG. 1 may support one or more architectural events called yield events. The yield events transfer the execution from the currently running instruction stream to the channel's yield event service routine. The channel's service routine belongs to the same process/context of the currently running instruction stream. The yield event is signaled when the scenario associated with the channel triggers.

The monitor 110 tracks the various events or conditions, and if the events or conditions it is programmed to detect occur, then the execution resources 105 are signaled to disrupt the normal control flow the program would otherwise follow. As indicated in FIG. 1, the disruption may result in an event handler being called or a thread switch occurring. For at least one alternative embodiment, a disruption of the normal control flow of the program is not necessarily triggered if the events or conditions monitored by the monitor 110 occur. Instead, one or more of a group of architectural states, called channels 1300, may be utilized to indicate whether a yield event should occur when all conditions for a scenario are detected by the monitor 110. That is, the channel may be programmed so that, when a scenario is detected, a yield event will occur. Without such indication in the channel, the satisfaction of a scenario, though detected, may not cause a yield event.

The processor 100 illustrated in FIG. 1 thus includes a set of architecture states called channels 1300. Each channel specifies a trigger-action mapping. The trigger is the scenario that is associated with the channel. Response to occurrence of the scenario, a yield event handler may record the occurrence and respond by invoking a service routine, such as channel service handler 185 illustrated in FIG. 1. The yield event handler may be a hardware, firmware, or software mechanism.

In addition, at least one embodiment of the processor 100 may also include a yield block indicator ("BI"), 1380. The value of the BI 1380 may provide an override function. That is, the value of the BI 1380 indicates whether, despite a channel that indicates that a yield event should occur upon occurrence of a scenario, the yield event should not be taken. For at least one embodiment, the BI 1380 includes a field for each ring level of privilege. Thus, the BI 1380 may be a register or set of registers.

One example of a specific detectable condition is that data may be missing from a cache memory, resulting in the event of a cache miss occurring. In fact, a program may generate a pattern of memory accesses that causes repeated cache misses, thereby degrading performance. Such an occurrence of a certain number of cache misses within a period of time or during execution of a portion of code is one example of an event that indicates a relatively low level of progress is being made in executing that section of code. The monitor 110 may be programmed to monitor for and detect that this or other detectable conditions have occurred, or have occurred a certain number of times.

Other detectable events which may be low progress indicators may relate to various other microarchitectural or structural details of the execution resources. A monitor may detect a condition involving one or more of a stall of a resource, a cache event, a retirement event, a branch or branch prediction result, an exception, a bus event, or a variety of other commonly monitored or performance-impacting events or conditions. The monitor 110 may count or otherwise time, quantify, or characterize such events or conditions, and may be programmable when a particular metric associated with one or more events or conditions occurs.

FIG. 1 illustrates that the storage medium 150 may also include an operating system ("OS") 180 as well as the channel service handler mechanism 185. For at least one embodiment, the operating system 180 may be minimally involved in the user-level threading techniques described herein. For example, the OS 180 may be involved in saving and restoring contexts during yield event processing. The operating system 180 may thus provide context management services. The channel states may be part of the context that the OS 180 manages.

For at least one embodiment, however, the OS 180 is not involved with delivering the yield event. For such embodiment, the satisfaction of a programmed scenario (that is, a scenario that has been programmed into a channel in order to trigger a yield event) triggers a yield event that is delivered via the yield event handler in hardware or firmware. For at least one embodiment, for example, the instruction triggering satisfaction of the scenario may be tagged, via hardware. Such tag may be processed in order to deliver the yield event. Such processing may occur, for example, in hardware or firmware, such as microcode ROM instructions, of the execution resources 105. This hardware or firmware mechanism that effects transfer of control for a yield event is sometimes referred to herein as the "yield event handler."

Control may be transferred, via the yield event handler, to the channel service handler 185. In this manner, processing for an architecturally-defined scenario may be performed directly by user-level code with minimal intervention of the OS 180. Scenario condition detection and yield event delivery (including control transfer) are transparent to the OS 180 for such embodiment.

For at least one other embodiment, however, satisfaction of the scenario may trigger an internally-generated software interrupt rather than triggering a hardware-delivered yield event as discussed above. For such embodiment, the operating system 180 may invoke the channel service handler 185 when a yield event software interrupt occurs.

Regardless of how the yield event is delivered (hardware vs. software), the yield event may be handled by user-level code. That is, under either approach control may be transferred to the channel service handler 185, which may, in effect, transfer control to a user-defined service thread or handler responsive to detection of the trigger condition. This control transfer disrupts execution of the current instruction stream that was executing when the yield event occurred.

Figure 2:
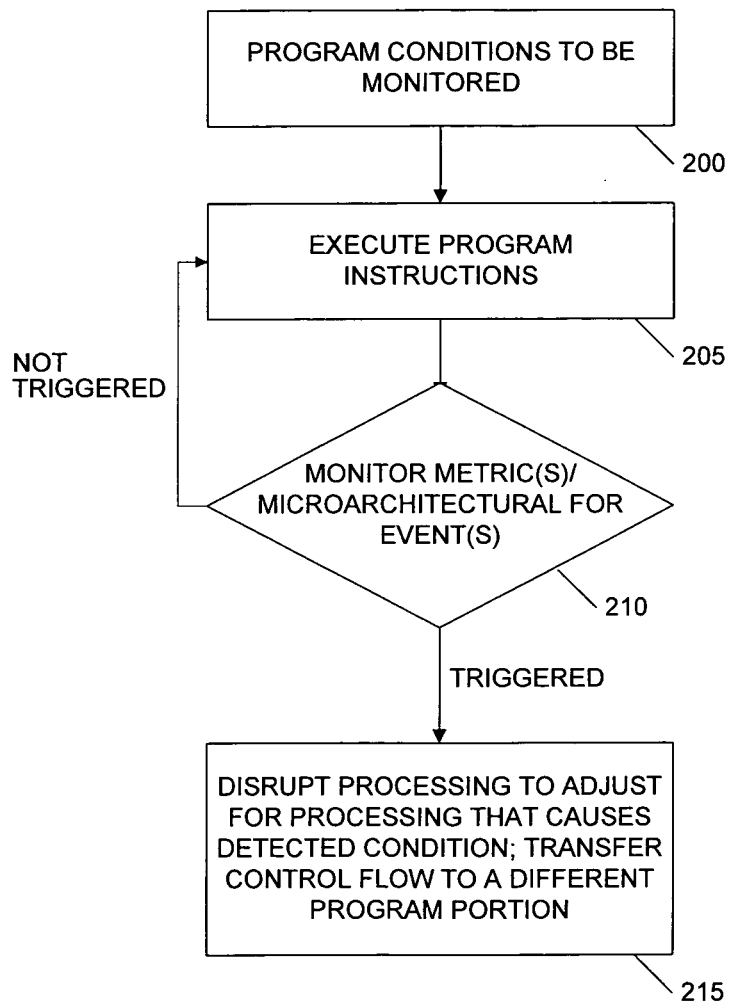
FIG. 2 illustrates a flow diagram of operations for one embodiment of the system of FIG. 1.

FIG. 2 illustrates a flow diagram of operations for one embodiment of the system of FIG. 1. As indicated in block 200 of FIG. 2, the program 160 may set conditions to cause a change in the execution control flow. For example, the enablement logic 120 may control both activation of the monitor and which event(s) to detect. Accordingly, at block 200 the program 160 may invoke the enablement logic 120 to activate the monitor 110 to detect one or more microarchitectural or architectural processor events. Alternatively, the enablement logic 120 may enable and/or mask events, and the monitor 110 may itself also be programmable for further flexibility in specifying the events or conditions within the execution resources or system that are tracked. In either case, the program 160 itself may specify conditions that are to be watched during its own execution.

For example, the program 160 may be a program that includes a main thread that invokes the enablement logic 120 to indicate that the monitor 110 should monitor for a particular scenario. The scenario may include a single "raw event" or, alternatively, may be a composite scenario that includes two or more raw events. For at least one other embodiment, however, the hardware of the monitor 110 is dedicated, or "hardwired", to monitor for certain raw events.

The program 160 may also, at block 200, modify one or more of the channels 1300 to indicate the handler or thread 170 which is to be activated when the monitored condition(s) occur. For example, the program 160 may be a program which includes a main thread and a service thread or service routine that attempts to improve execution of the main thread if conditions the program specifies occur. The main thread may include an EMONITOR-type instruction (discussed below) to map a handler to the monitored condition(s).

As indicated in block 205, the program instructions are executed. Execution of the program causes the state of the execution resources to change. For example, a variety of conditions may occur or be present that inhibit forward progress in execution of the program. As indicated in block 210, the various processing metrics and/or microarchitectural conditions may be monitored to determine if the triggering event programmed in block 200 occurs. If the triggering state does not occur in block 210, disruption of processing is not triggered, and program execution continues by returning to block 205.

In some cases, the triggering state bears only an indirect relationship to execution of any single instruction. For example, a prior art breakpoint detector typically causes a break when an instruction pointer reaches a designed address. Such breakpoints are precise because a particular instruction (i.e., its address) directly triggers the break. Also, the prior art quiesce instruction itself causes a thread to stop at least temporarily. In contrast, some embodiments utilizing disclosed techniques trigger control flow changes on a set of conditions that are not necessarily caused by a single instruction, but rather may be caused by the overall program flow and/or system environment. Thus, while the monitor may repeatedly trigger at the same instruction execution state in a single system, other conditions, environments, system, etc., may cause different trigger points for the same program. In this sense, disclosed techniques, in some cases, provide an imprecise or asynchronous mechanism generating a control flow change that is not directly tied to an instruction execution boundary. Moreover, such an imprecise mechanism may, in some embodiments, test for events at a less fine granularity than each instruction and/or may delay recognition of events for some period of time because architectural correctness does not depend on any processing-rate-enhancing service routines executing at any particular point in time.

When a single or composite set of conditions associated with a scenario is detected by the monitor in block 210, processing of the program may be disrupted as indicated in block 215. Whether or not disruption 215 occurs is governed by the current contents of the channels 1300. If the detected scenario has been mapped to a handler or other thread 170, then disruption processing 215 may be executed. If a channel indicates that such disruption should be triggered, processing proceeds to block 215. Otherwise, processing loops back to block 205.

Generally, at block 215 the system may responsively adjust because processing of the program is occurring inefficiently or in a manner other than the manner the programmer desired. For example, another software routine such as another program portion may be invoked. The other program portion may be another thread unrelated to the original thread or may be a service thread that helps execute the original thread, for example by prefetching data to reduce cache misses. Alternatively, a program-transparent (e.g., hardware) mechanism may perform some optimizations, reconfiguration (including, but not limited to reconfiguration of the monitor setup), reallocation of resources or the like to hopefully improve processing.

Figure 3:
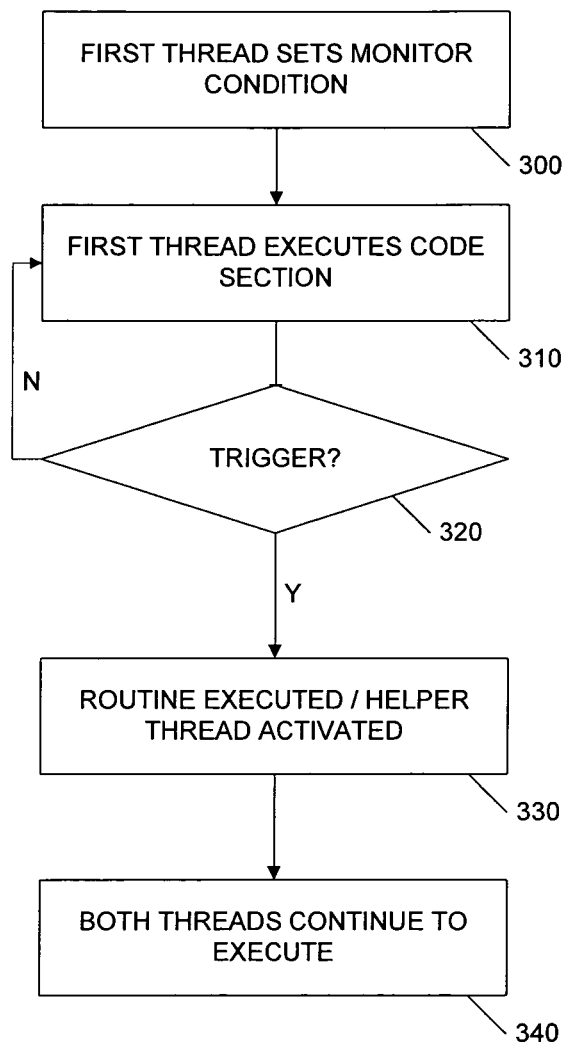
FIG. 3 illustrates a flow diagram of operations for another embodiment of the system of FIG. 1.

One example that invokes a service thread is illustrated in FIG. 3. In particular, the flow diagram of FIG. 3 details operations for one embodiment of the system of FIG. 1 in which the execution resources are multithreaded resources and the program invokes a service thread when a certain triggering condition occurs. Thus, as indicated in block 300, a first thread (e.g., a main program) sets a monitor condition.

Such setting 300 may include at least two actions. First, the program may execute one or more instructions to program the monitor 110 (see FIG. 1) to detect a certain condition or conditions as defined by an architectural scenario. (For embodiments where the monitor 110 is dedicated to monitor for certain conditions and is thus not programmable, this first action is not performed.) In addition, the program may execute an instruction that maps a particular handler to the condition. The latter action may be accomplished via execution of an instruction such as the EMONITOR instruction discussed below. The EMONITOR instruction modifies one of the channels 1300 to map an address to which control should be transferred in response to a trigger condition.

The first thread executes a code section as indicated in block 310. If the triggering condition does not occur, as indicated at block 320, then the code section continues executing, as indicated in block 310. The trigger determination 320 need not be a periodic polling-type approach to determine whether the scenario conditions have been met. Instead, at least one embodiment of the trigger determination 320 may be accomplished by delivery of a hardware-handled yield event or an internally-generated software interrupt when a scenario mapped in any of the channels 1300 has been satisfied. The mechanism for handling the interrupt or exception such that a yield event is delivered upon satisfaction of the specified trigger condition(s) may be a ring 0 driver, a yield mechanism implemented in microcode ROM, or other event handler.

FIG. 3 is further discussed herein with reference to FIG. 1. For at least one embodiment, the event handler mechanism may, when a trigger condition specified in a channel has been satisfied, be triggered at block 320. The satisfaction of the trigger condition(s) specified in the channel may trigger disruption of processing of the main thread code. An event handler, such as a hardware event handler or ring 0 driver, may service the yield event at block 330.

The servicing 330 may include determining whether the instruction that caused the thread yield event to be triggered at block 320 is associated with a specified thread context for the yield event. That is, the event handler mechanism may determine whether the event should be delivered. If the thread yield event has occurred when the thread context for the EMONITOR instruction that set up the yield event is not active, then the event handler mechanism may immediately return control to the main thread code without executing any helper thread code.

The event handler may also perform additional processing at disruption block 330. For example, the event handler may determine whether any other required conditions, in addition to the scenario conditions, have been met for the yield event. For example, the event handler may determine whether the value of the blocking indicator 1380 indicates that a yield event should not be taken. If so, then the event handler mechanism may immediately return control to the main thread code without executing any helper thread code. Also, for example, if the action field 1326 (see discussion of FIG. 12, below) includes the status bit update value, then the channel is in "silent" mode, and no yields will be taken by the channel.

If the triggering condition does occur, then a service thread may be activated to assist the first thread as indicated in block 330. More particularly, upon satisfaction of raw event(s) for a scenario, a yield event may be delivered. (See discussion of Table 2, below). A yield event may be delivered synchronously or asynchronously. Delivery of the yield event may disrupt processing of the program that is currently executing. (See discussion of block 320, below).

Responsive to the yield event, control may be transferred to a channel service handler 185. The control may be transferred via a hardware mechanism that delivers the yield event, or alternatively may be transferred by the operating system 180 in response to an internally-generated software interrupt.

The yield event handler may determine whether it is appropriate to trigger a service thread or service routine. If so, the yield event handler may transfer control to a channel service handler 185 by transferring control to the instruction address indicated in the channel. The channel service handler 185 may activate the service thread or service routine. Accordingly, a service thread may be activated by a routine such as a channel service handler routine 185. Alternatively, the service thread may just be activated by a thread switch. For example, in one embodiment, the trigger condition signaled by the monitor 110 to the execution resource may cause the execution resource to jump to an event handler that spawns a service thread. In another embodiment, the service thread may just be one of the other active threads. In yet another embodiment, one or more special service thread execution slots may be provided by the processor and the monitor may cause a switch to a service thread from one of these slots. As indicated in block 340, both threads may then continue to execute. Hopefully, the service thread runs ahead and clears up conditions that would otherwise cause the first thread to stall or perform poorly.

Figure 4:
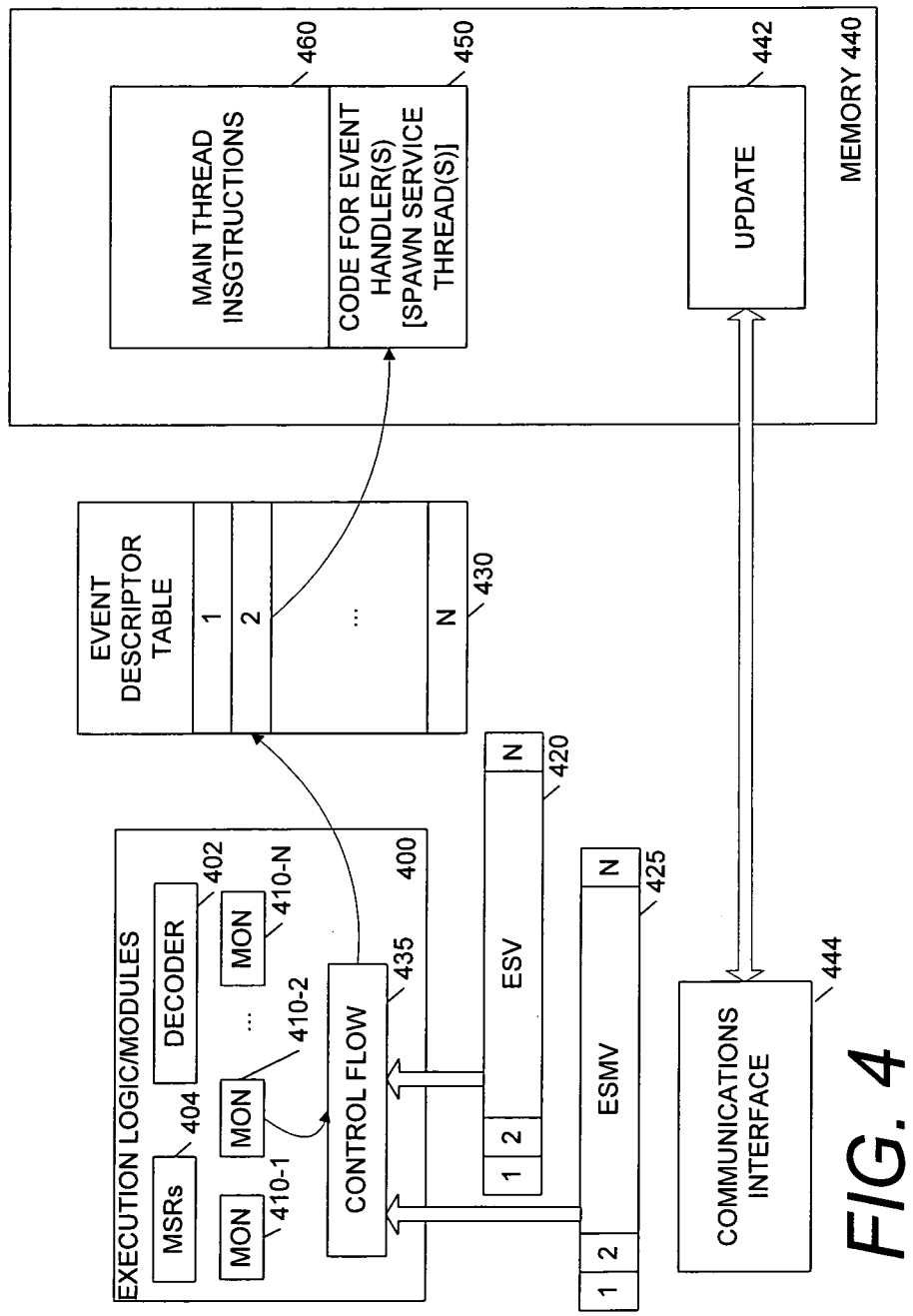
FIG. 4 illustrates another embodiment of a system that can respond to multiple different performance events and/or to composite performance events.

FIG. 4 illustrates another embodiment of a system that can respond to multiple different performance events and/or to composite performance events. In the embodiment of FIG. 4, execution resources 400 are shown as including a set of N monitors 410-1 through 410-N. Additionally, an event schema vector (ESV) storage location 420 and an event schema vector mask (ESVM) storage location 425 are provided. The embodiment of FIG. 4 shows a number of monitors (N) corresponding to the number of bits in the event schema vector and the event schema mask vector. In other embodiments, there may be different numbers of monitors and bits in these vectors, and the monitors may or may not correlate directly to the bits. For example, a condition involving multiple monitors may correlate to a single vector bit in some embodiments.

The execution resources 400 are optionally coupled to an event descriptor table 430 (EDT), which may be locally implemented on the processor or in a co-processor or system memory. Control flow logic 435 is coupled the monitors 410-1 through 410-N and to receive values from the event schema vector and the event schema vector mask. The control flow logic 435 changes the control flow for processing logic when a condition detected by one or more of the monitors is enabled according to the event schema vector and event schema vector mask.

The embodiment of FIG. 4 also illustrates decode logic 402 and a set of machine or model specific registers 404 (MSRs). Either or both of the decode logic 402 and the model specific registers may be used to program and/or activate the monitors and the event schema vector and mask. For example, MSRs may be used to program the types or number of events that trigger the monitors. MSRs may also be used to program the event schema vector and mask. Alternatively, one or more new dedicated instruction(s) to be decoded by the decoder 402 may be used for either or both of programming the monitors and the event schema vector and mask. For example, a yield instruction (such as an embodiment of the EMONITOR instruction discussed below) may be used to enable disruption of processing a program when a certain set of conditions occurs. Some or all of the conditions may be specified by an operand to the yield instruction or otherwise programmed in advance of its execution. Such a yield instruction may be decoded by the decoder 402 to trigger a microcode routine, to produce a corresponding micro-operation or micro-instruction, or sequences of micro-operations to directly signal appropriate logic, or activate a co-processor or to otherwise implement the yield functionality. The concept of yielding may appropriately describe the instruction in some embodiments in which one thread is allowed to continue after executing the yield instruction but may be slowed at some point by execution of another thread or handler. For example, a largely single-threaded program may invoke extra service threads and share the processor with those extra service threads.

In the embodiment of FIG. 4, a memory 440 includes event handler code 450 and a set of main thread instructions 460. In some embodiments, the event descriptor table may be stored in the same memory or in the same memory hierarchy as the main thread instructions 460 and handler code 450. As previously discussed, execution of code for the handler(s) may spawn a service thread to assist the main program in executing efficiently.

The memory 440 may also store an update module 442 to communicate via a communications interface 444. The update module 442 may be a hardware module or a software routine executed by the execution resources to obtain new conditions to be programmed into various monitors and/or enablement logic. The update module 442 may also obtain new service threads or routines. For example, these may be downloaded by a software program from the vendor of the software program to provide enhanced performance. Thus, the network interface 444 may be any network and/or communication interface that allows information transfer via a communication channel. In some cases, the network interface may interface to the Internet to download new conditions and/or service routines or threads.

In one embodiment, each bit of the event schema vector indicates the occurrence or non-occurrence of a particular event, with the particular event possibly being a composite event reflective of (and/or expressed via Boolean operations in terms of) a variety of conditions or other events. Occurrence of the particular event may set the bit in the event schema vector. Each bit in the event schema vector may have a corresponding bit in the event schema mask vector. If the mask bit indicates that the particular event is masked, then the control flow logic 435 may disregard the event, although the bit in the event schema vector may remain set due to its occurrence. The user may choose whether to clear the event schema vector when unmasking events. Thus, an event may be masked for some time and handled later. In some embodiments, the user may choose to specify the trigger as a level trigger or an edge trigger, depending upon various issues such as the relationship between event update, sampling and reset (or the hold time of a trigger event in the ESV).

If the mask bit indicates that an event is unmasked, then the control flow logic 435 calls an event handler for that particular event in this embodiment. The control flow logic 435 may vector into the event descriptor table 430 based on the bit position in the event schema vector, and accordingly, the event descriptor table may have N entries corresponding to the N bits in the event schema vector. The event descriptor table may contain a handler address indicating an address to which the control flow logic 435 should re-direct execution, and may also include other information as may be useful in a particular embodiment. For example, privilege level, thread, process, and/or other information may be maintained or updated in the event descriptor table.

In another embodiment, the event descriptor table 430 may not be necessary or may be a single entry that indicates an address for a single event handler to handle all events. In this case, the entry may be stored in a register or other processor storage location. In one embodiment, a single handler may be used, and that handler may access the event schema vector to determine which event occurred and therefore how to respond. In another embodiment, the event schema vector may collectively define an event that causes the control flow logic 435 to call a handler. In other words, the event schema vector may represent a variety of conditions that together signal one event. For example, the event schema mask vector may be used to designate which of the events indicated by the event schema vector must occur to trigger execution of the handler. Each bit may represent a monitor reaching a programmable condition. When all the non-masked monitors reach their respective designated conditions, then the handler is called. Thus, the entire event schema vector may be used to designate some complex composite condition that should trigger the execution of the handler.

In another embodiment, multiple event schema vectors and masks may be used to designate different conditions. The different vectors may vector to different handlers via the event descriptor table or some other mechanism. In another embodiment, some bits of one or more event schema vectors may be grouped to form events that trigger the calling of handlers. A variety of other different permutations will be apparent to those of skill in the art.

Figure 5A:
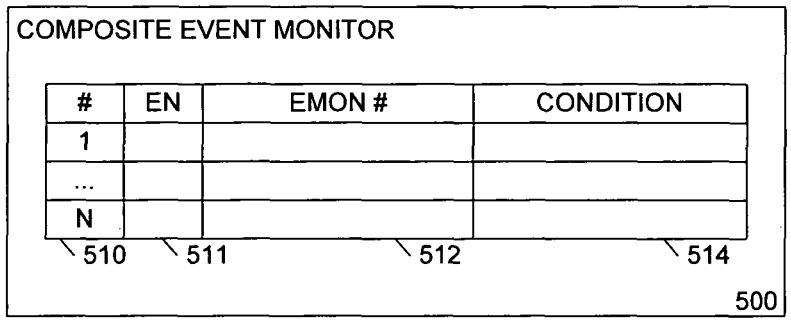
FIG. 5a illustrates one embodiment of a monitor that may recognize composite events.

FIG. 5a illustrates one embodiment of a monitor 500 that is programmable and capable of interfacing with a variety of performance monitors to signal a composite event. For example, such performance monitors may record occurrences of various microarchitectural events or conditions such as: cache misses incurred at a given level of cache hierarchy, branch retirement; branch misprediction (or retirement of mispredicted branches); trace cache delivery mode changes or events; branch prediction unit fetch requests; cancellations of memory request; cache line splits (count of completion of a split load, store, etc.); replay events; various types of bus transactions (e.g., locks, burst reads, writebacks, invalidates); allocations in a bus sequencer (or only certain types); numerical assist (an underflow, denormal, etc.); execution/retirement of a particular type of instruction or micro-operation (uOP); machine clear (or count of pipeline flushes); resource stalls (register renaming resources, pipeline, etc.); processing of tagged uOPs; instructions or uOPs retired; lines allocated (&/or of a particular state (e.g., M)) in cache; a number of cycles instruction fetch is stalled; a number of cycles instruction length decoder is stalled; a number of cache fetches; a number of lines allocated (or evicted) in cache or the like. These are only a few examples of microarchitectural events or conditions that may be monitored. Various other possibilities as well as combinations of these or other conditions will be apparent to one of skill in the art. Moreover, those and/or other conditions or events may be monitored with any of the disclosed or like monitors in any of the disclosed embodiments.

Performance monitors are often included in processors to count certain events. The programmer may read such performance monitors' counts by manufacturer-defined interfaces such as specific processor macro-instructions like the RDPMC instruction supported by known Intel Processors. See, e.g., Appendix A of Volume III of the Intel Software Developers Guide for the Pentium® 4 Processor. Other internal or micro-instructions or micro-operations may be used to read performance counters in some embodiments. Thus, for example, performance monitors may be adapted for use with disclosed techniques. In some cases, a programmable performance monitor may be modified to provide event signaling capabilities. In other embodiments, performance monitors may be readable by other monitors to establish events.

In the embodiment of FIG. 5a, the monitor 500 may include a set of programmable entries. Each entry may include an entry number 510, an enable field 511, a performance monitor number (EMON #) 512 to specify one of a set of performance monitors and a triggering condition 514. The triggering condition may be, for example, a certain count that is reached, a count that is reached within a certain period, a difference in count, etc. The monitor 500 may include logic to read or otherwise be coupled to receive counts from the designated performance monitors. The monitor 500 signals the control flow logic when the various M conditions occur. A subset of the M entries may be used by selectively programming the enable fields for each entry.

Figure 5B:
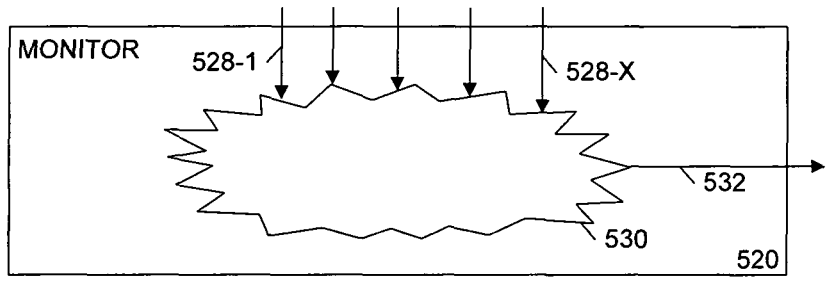
FIG. 5b illustrates another embodiment of a monitor.

FIG. 5b illustrates another embodiment of a monitor 520. The monitor 520 represents a custom composite event monitor. The monitor 520 receives a set of signals via signal lines 528-1 through 528-X from various execution resources or resource portions and combines them via combinational logic 530. If the proper combination of signals is received, the monitor 520 signals the control flow logic via an output signal line 532.

Figure 5C:
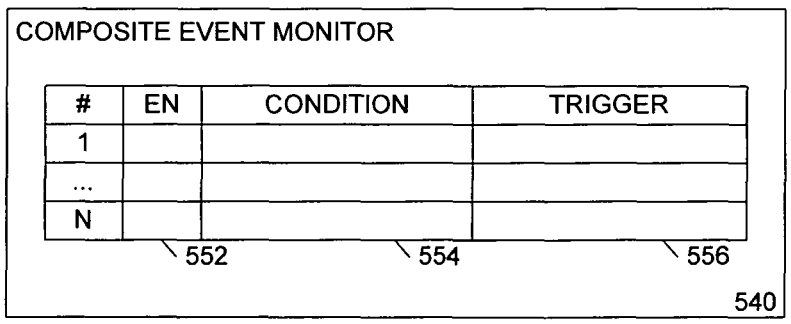
FIG. 5c illustrates another embodiment of a monitor.

FIG. 5c illustrates another embodiment of a monitor 540. The monitor 540 includes a table having M entries. Each entry includes an enable field 552, a condition field 554, and a trigger field 556. The condition field may be programmed to specify what combination of input signals is to be monitored. The conditions may or may not be tied to other event detecting structures such as performance monitors, and therefore may be more general than those discussed with respect to FIG. 5a. The trigger field 556 may specify the state of those input signals needed to signal the control flow logic. Again, each entry may be enabled/disabled via the enable field 552. In some embodiments, the condition and trigger fields may be combined. Various combinations of these and other types of known or otherwise available like, simpler, or more complex monitors will be apparent to one of skill in the art.

Figure 6:
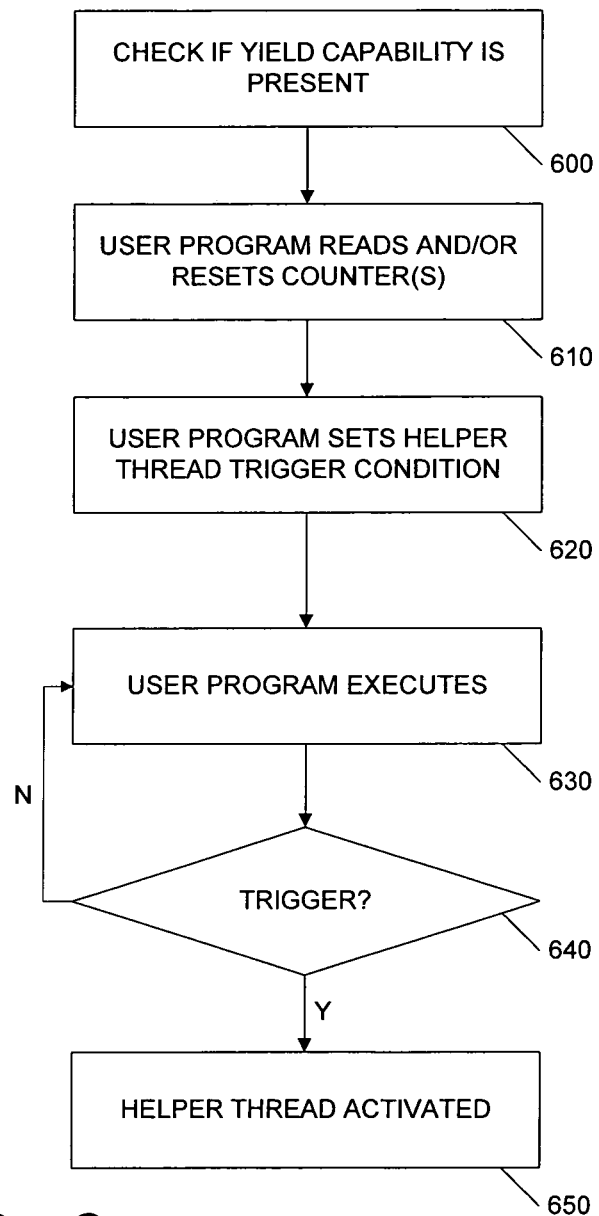
FIG. 6 illustrates a flow diagram for execution of a user program that activates service threads in response to program-definable triggers according to one embodiment.

FIG. 6 illustrates a flow diagram for execution of a user program that activates service threads in response to program-definable triggers according to one embodiment. In block 600, the program first tests whether the yield capability is present. The "yield capability" may be used herein as shorthand to refer to the ability of to disrupt processing flow based on a condition or event occurring. Alternatively to testing for yield compatibility support, the yield capability may use opcodes previous defined as no-operation opcodes and/or previously unused or undefined MSRs so that use of the yield capability will have no effect on processor lacking such capabilities. The presence of such capabilities can also be queried via checking special CPU-ID that encodes hints indicating if such capabilities are present on a given processor or platform. Similarly, special instruction such as Itanium's PAL (processor-abstraction layer) call or SALE (system abstraction layer environment) can be used to query the processor specific configuration information including availability of such program-definable yield capability. Assuming the yield capability is present, then the user program may read and/or reset various counters, as indicated in block 610. For example, performance monitor counters may be read so that a delta may be computed, or the values may be reset if that capability is available.

As indicated in block 620, the user program then sets the service thread trigger condition. The yield capability may be accessible at a low privileged level (e.g., a user level) such that any program or most programs can utilize this feature. For example, the yield capability may be available to ring three privilege level programs in a Pentium® Processor family processor, or the like. Therefore, the user program itself is able to set its own performance-based trigger conditions. A user program or operating system that is aware of existence of such context-sensitive monitor configurations may choose to save and restore such application specific monitor configuration/setup across thread/process context switch, if the application demands or the operating system can provide persistent monitoring capability.

As indicated in block 630, the user program continues to execute after programming the yield conditions. Whether the yield conditions occur is tested in block 640. If the yield condition does not occur, then program execution continues as indicated in block 630. If the yield condition does occur, then a service thread is activated, as indicated in block 650. The flowchart form of FIG. 6 tends to imply that a synchronous polling for events occurs, and this approach may be used in some embodiments. However, some embodiments asynchronously react to events when they occur or within a number of clock cycles of when they occur rather than polling for them at certain intervals. In some embodiments, a monitor condition may be set outside of a loop or other code section to detect a particular condition. This concept is demonstrated by the following pseudo-code example for a main thread and a service thread.

```
main( )
{
   CreateThread(T)
   WaitForEvent( )
   n=NodeArray[0]
   setup Service Trigger //Intrinsic
   while (n and remaining)
      {
      work ( )
      n→i=n→next→j+n→next→k+n→next→1
      n=n→next
      remaining--
      //Every Stride Time
      //global_n=n
      //global_r=remaining
      //SetEvent( )
      }
   disable Service Trigger //Intrinsic
}
T( )
{
   Do Stride times
      n→i=n→next→j+n→next→k+n→next→1
      n=n→next
      remaining--
   SetEvent( )
   while (remaining)
      {
      Do Stride times
         n→i=n→next→j+n→next→k+n→next→1
```

```
//Responsible for most effective prefetch
//due to run-ahead
n=n→next
remaining--
WaitForEvent( )
if (remaining<global_r)   //Detect Run-Behind
    remaining=global_r //Adjust by jump ahead
    n=global_n
}
}
```

One advantage of setting the trigger outside the loop is that compiler optimizations within the loop will not be inhibited. For example, some compilers do not optimize loops or sections of code with intrinsics such as those which may be used to activate the yield capability. By placing such intrinsics outside the loop, interference with compiler optimizations may be removed.

Figure 7:
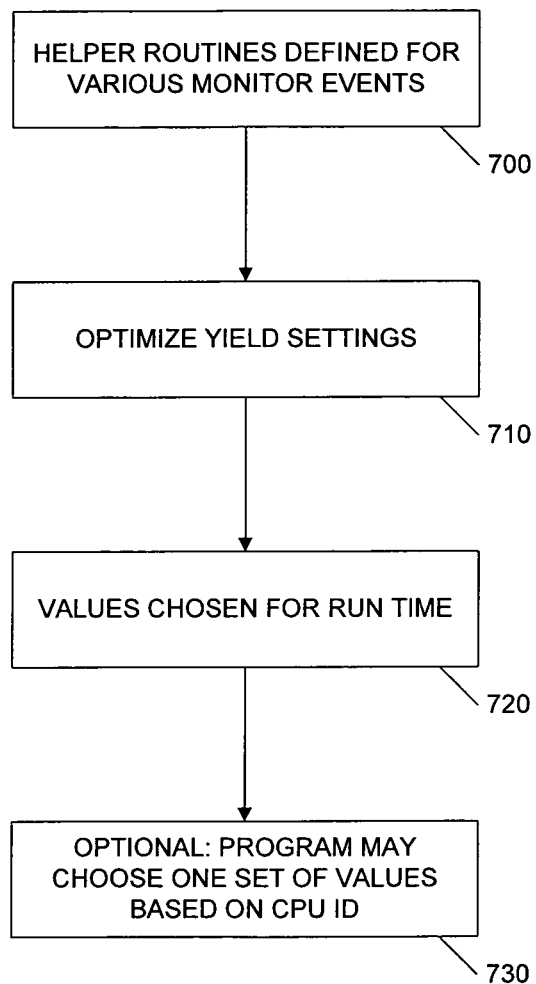
FIG. 7 illustrates a flow diagram for a process of refining monitor settings according to one embodiment.

FIG. 7 illustrates a flow diagram for a process of refining yield settings according to one embodiment. Using a processor with a yield capability or the like, a programmer may design a program as well as service routines to be invoked under various circumstances as indicated in block 700. Thus, service routines may be provided for various processing-impeding conditions that the programmer anticipates. The processor can invoke these routines if and when they are needed during execution of the program. The yield settings may include the event schema vector and mask values and/or monitor settings or the like.

On a particular processor, a certain yield setting might result in a favorable execution throughput. However, such determination may be quite difficult manually and thus better derived empirically. Therefore a compiler or other tuning software (e.g., the Intel VTune code analyzer) may repeatedly simulate the code with different yield settings, thereby deriving optimal or desirable settings as indicated in block 710. Thus, desirable values for yield settings for runtime may be chosen as indicated in block 720. A program may be simulated on multiple different versions of a processor or multiple different processors, or in multiple different systems to derive different yield settings. A system or processor identification such as a CPU ID may be used by the program to select which yield settings to apply when it runs as indicated in block 730.

Furthermore, the use of a compact group of settings to optimize performance may facilitate software updates. For example, new yield values may be downloaded to optimize performance for a given processor or may be used to update software when new processors are released. Such new values may allow a binary or modular modification which does not substantially disturb or jeopardize the functionality of the existing software.

Figure 8:
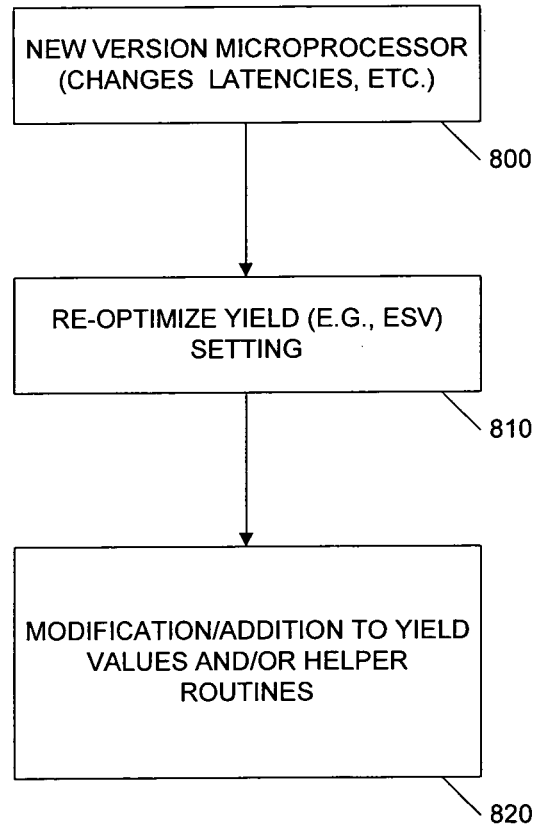
FIG. 8 illustrates a flow diagram for a process of updating software according to one embodiment.

FIG. 8 illustrates a flow diagram for a process of updating software according to one embodiment. As indicated in block 800, a new version of a microprocessor is released. The new version may have different latencies associated with microarchitectural events such as cache misses. Therefore, a routine previously written to activate service threads after a given number of cache misses may be less effective due to a new cache miss latency. Therefore, the yield settings are re-optimized as indicated in block 810.

Once new settings are derived, the program can be updated (e.g., via an update module that may be a part of the program) as indicated in block 820. A modification or addition to the yield values may be performed, depending on the details of the implementation. Moreover, additional or different service routines may be added to assist on the new processor implementations. In either case, the yield capability can enable the delivery of performance enhancements after the initial delivery of the software. Such a capability may be quite advantageous in a great variety of scenarios, and may be used just to provide new optimizations without any change in the underlying hardware. Additionally, the underlying software may be maintained in some cases. For example, if a service routine is written to deal with a synthetic event (e.g., bad cache misses), then on different hardware the composition of events which triggers this routine may be changed without changing the actual routines themselves. For example, the monitor configuration values and/or ESV/ESVM values may be changed and the routines left intact.

Figure 9A:
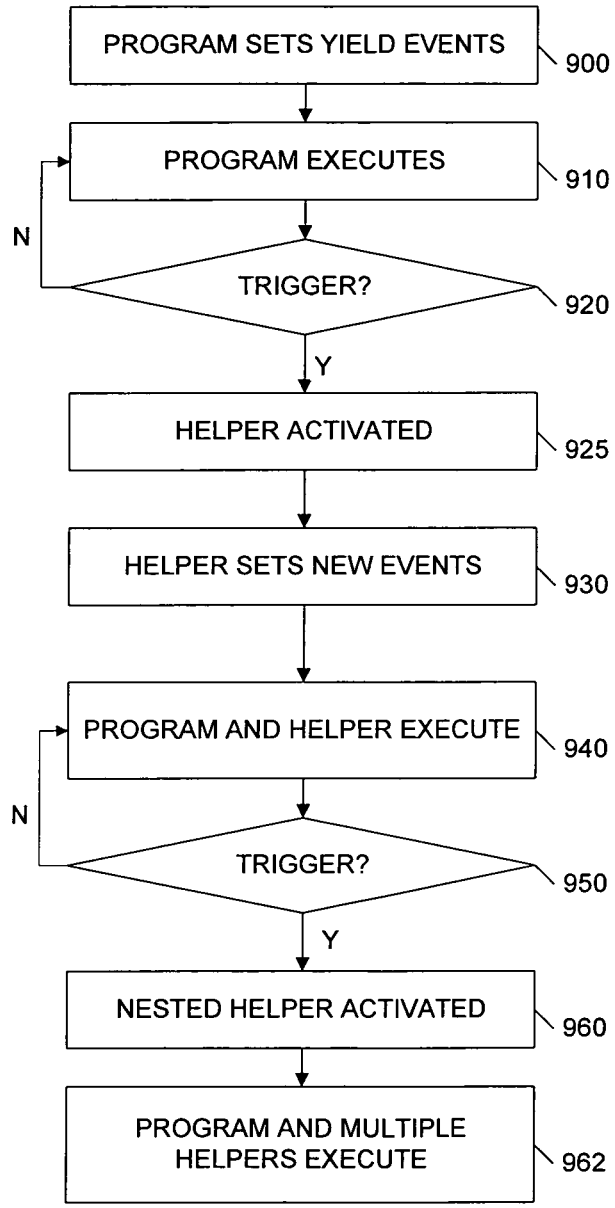
FIG. 9a illustrates a flow diagram in which multiple nested service threads are activated to assist processing of a program.

The effectiveness of disclosed techniques may be further enhanced by creating nested service threads, and FIG. 9a illustrates one example of such usage. In the embodiment of FIG. 9a, the program sets the yield event(s) in block 900. The program continues execution in block 910. Whether a yield event (a trigger) occurs is tested in block 920. If no yield event occurs, then program execution continues as shown via block 910. If a yield event occurs, then a service thread is activated as indicated in block 925. The service thread sets another yield event as indicated in block 930. Thus, the service thread effectively identifies a further condition that indicates that further processing assistance may be helpful. Such further condition may indicate whether the first service thread is effective and/or may be designed to indicate a further condition that may be suspected to develop as a result of or in spite of activation of the first service thread.

As indicated in block 940, both the program and the service thread are active and executing threads. These threads execute concurrently in the sense that they are both active and executing in a multithreaded processing resource. Whether the new trigger condition has occurred by the combination of both the program and the service thread is tested in block 950. If the new triggering condition does not occur, then execution for both threads continues as indicated in block 940. If the new triggering condition does occur, a second or nested service thread is activated as indicated in block 960. Thereafter, the program and multiple service threads may be active and execute as indicated in block 962. Thus, multiple nested service threads may be employed in some embodiments.

In one embodiment, multiple service threads (either nested or non-nested) may be activated by the use of virtual threads. Rather than dedicating a full set of resources to expand the number of threads a processor can handle, a processor may effectively cache context data (in a cache location, a register location, or other storage location). Accordingly, one physical thread slot may be rapidly switched between multiple threads.

Figure 9B:
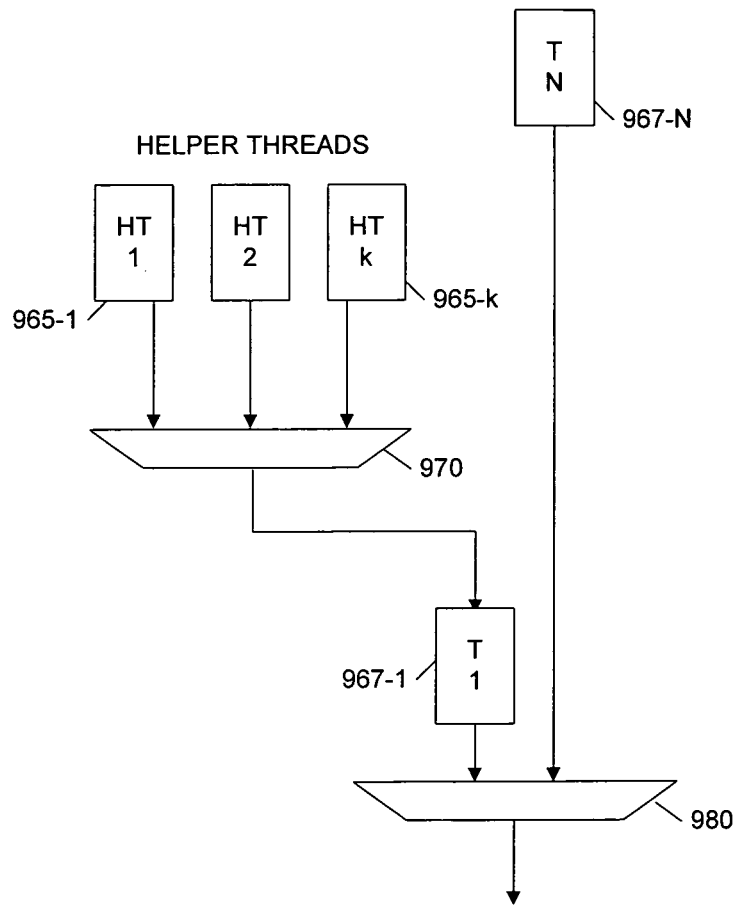
FIG. 9b illustrates thread switching logic for one embodiment which supports virtual threads.

For example, the embodiment of FIG. 9b illustrates thread switching logic according to one embodiment that allows virtual threads to be switched into a limited number of physical thread slots which have dedicated hardware to maintain a thread context. In the embodiment of FIG. 9b, a plurality of service threads 965-1 through 965-k may be presented to a virtual thread switcher 970. The virtual thread switcher 970 may also include other logic and/or microcode (not shown) to swap context information between the new and previously selected service threads. The virtual thread switcher 970 may be triggered to switch threads by either a synchronous or an asynchronous stimulus. For example, an asynchronous event defined by a yield-type of instruction may cause a thread switch between the virtual threads. Additionally, service threads may include synchronous means such as a halt, quiesce, or other type of execution-stopping instruction to signal a switch to another thread. The virtual thread switch logic 970 presents a subset (e.g., in the embodiment of FIG. 9b, one) of the virtual threads to the processor thread switch logic 980. The processor thread switch logic 980 then switches between one of the service threads as a first thread 967-1 and its other N−1 threads, up to thread 967-N.

Figure 10A:
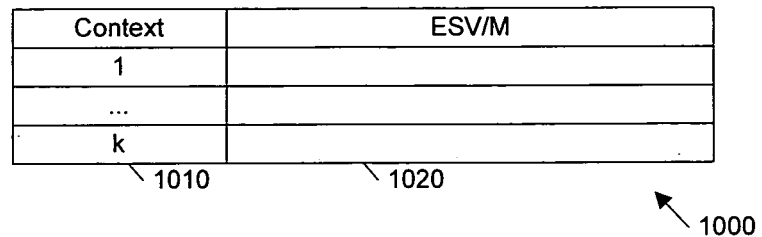
FIG. 10a illustrates one embodiment of a context-sensitive event schema vector and mask implementation.

In some embodiments, it may be advantageous to confine the yield capability to a particular program or thread. Therefore, the yield capability may be made context sensitive or non-promiscuous. For example, FIG. 10a illustrates one embodiment of a context-sensitive event schema vector and mask implementation. In the embodiment of FIG. 10a, a storage area 1000 includes a context indicator field 1010 associated with each event schema vector and mask storage location 1020. The context indicator field identifies the context to which each event schema vector and mask pair applies. For example, a context value such as value of a control register (e.g., CR3 in an x86 processor indicating operating system process ID) may be used. Additional or alternatively, thread number information may be used to define context. Therefore, in some embodiment, when a particular context is active, certain context specific events may be enabled to disrupt processing. As such, the yield mechanism may be non-promiscuous in that its events only affect certain contexts.

Figure 10B:
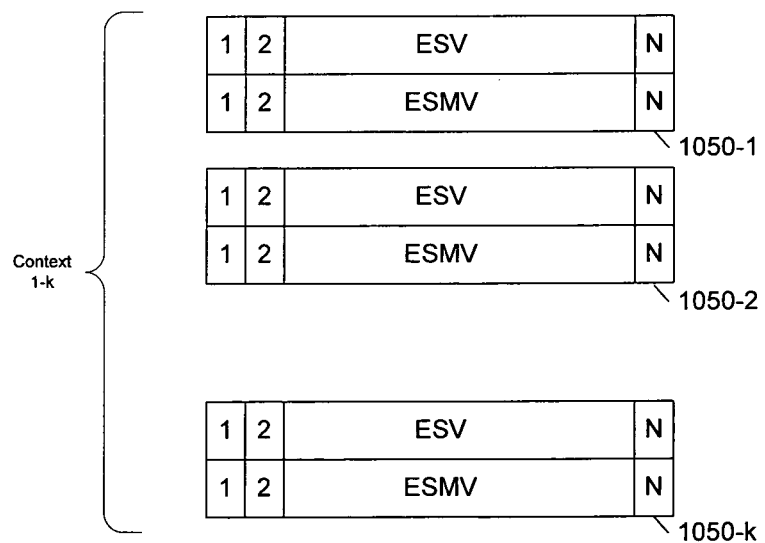
FIG. 10b illustrates one embodiment of a context-sensitive event schema vector and mask implementation.

FIG. 10b illustrates another embodiment of a context-sensitive event schema vector and mask implementation. In the embodiment of FIG. 10b, an integer number k of contexts may be handled by providing one set of event schema vector and mask locations 1050-1 through 1050-k for each of the k contexts. For example, there may be k threads in a multi-threaded processor, and each thread may have an event schema vector and mask or like yield-enablement mechanism. Notably, in other embodiments, it may be undesirable to track events only in certain contexts. For example, events may be reflective of overall processing activity and/or events may pertain to or be caused by multiple related threads.

Figure 11:
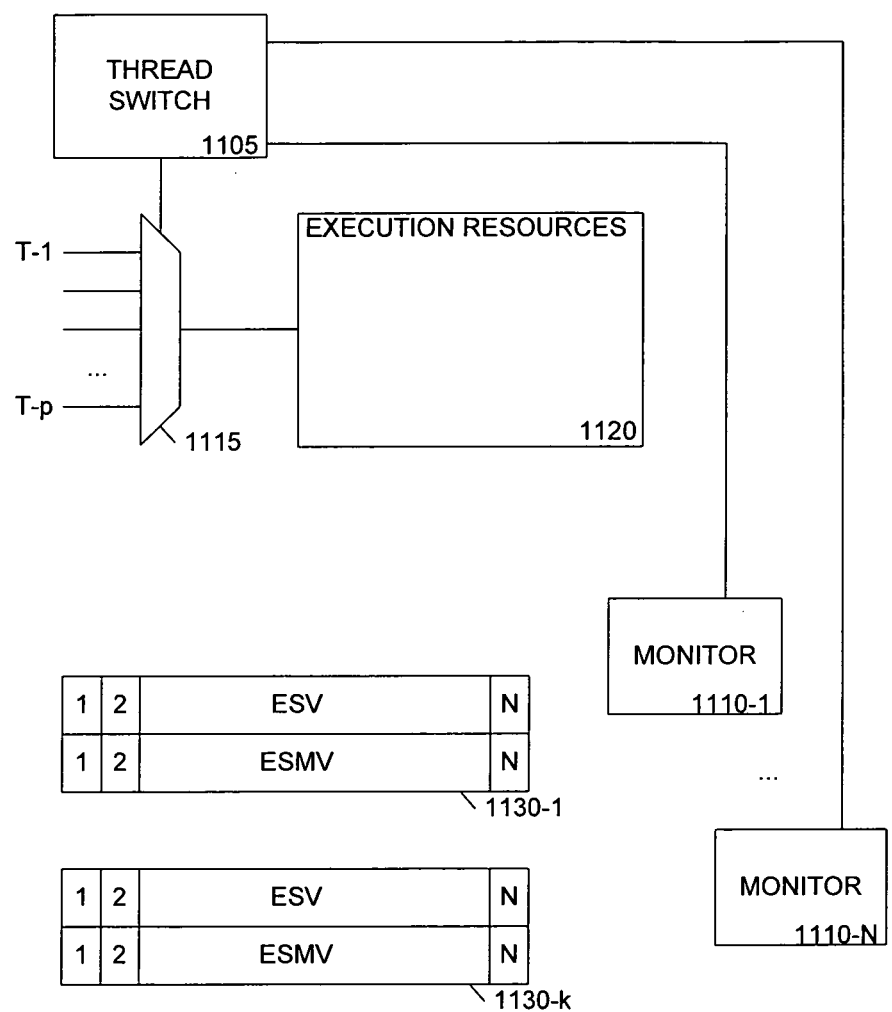
FIG. 11 illustrates one embodiment of a multithreaded processor which performs thread switching based on monitor events.

FIG. 11 illustrates one embodiment of a multithreaded processor which performs thread switching based on monitor or yield-type events. Although many embodiments have been discussed as disrupting processing flow by causing a handler to execute, other embodiments may define events that cause thread switches in a multithreaded processor. For example, in the embodiment of FIG. 11, thread switch logic is coupled to receive signals from a set of N monitors 1110-1 through 1110-N. The thread switch logic 1105 may also be coupled to one or more sets of event schema and mask pairs 1130-1 through 1130-p (p is a positive whole number). The event schema and mask pairs may allow the thread switch to combine and/or disregard certain monitor events in determining when to switch threads.

Execution resource 1120 may support execution of p threads, yet may be indifferent to whether an instruction belongs to a particular thread. The execution resource may be an execution unit, fetch logic, a decoder, or any other resource used in instruction execution. A multiplexer 1115 or other selection resource arbitrates between the various threads for access to the execution resource 1120. One of skill in the art will recognize that various resources may be shared or duplicated in a multithreaded processor and that various resources may have thread-switched access which allows a limited number of threads (e.g., one) to access the resource at a time.

If a set of conditions indicated by one or more monitors and/or one of the event schema vector and mask pairs occurs, the thread switch logic 1105 switches threads of execution. Thus, another thread may be activated instead of the thread that was active when the processor conditions matched those programmed. For example, a user program may control events that trigger thread switches.

In some multithreaded processors, each thread may have an associated set of event schema vector and mask pairs or the like. Thus, as shown in FIG. 11, the multiplexer 1115 may arbitrate between p threads, and there may be a corresponding p event schema and mask pairs. Just because a processor is multithreaded, however, does not mean that all implementations use multiple event schema vectors and masks. Some embodiments may use only one pair, or may use other enablement indicators. For example a single bit could be used as an enablement indicator to turn on or off a particular yield-type capability for the processor. For at least one other embodiment, the enablement indicator may be implemented on a per-channel basis (see, e.g., description of the channel action field, below).

Figure 12:
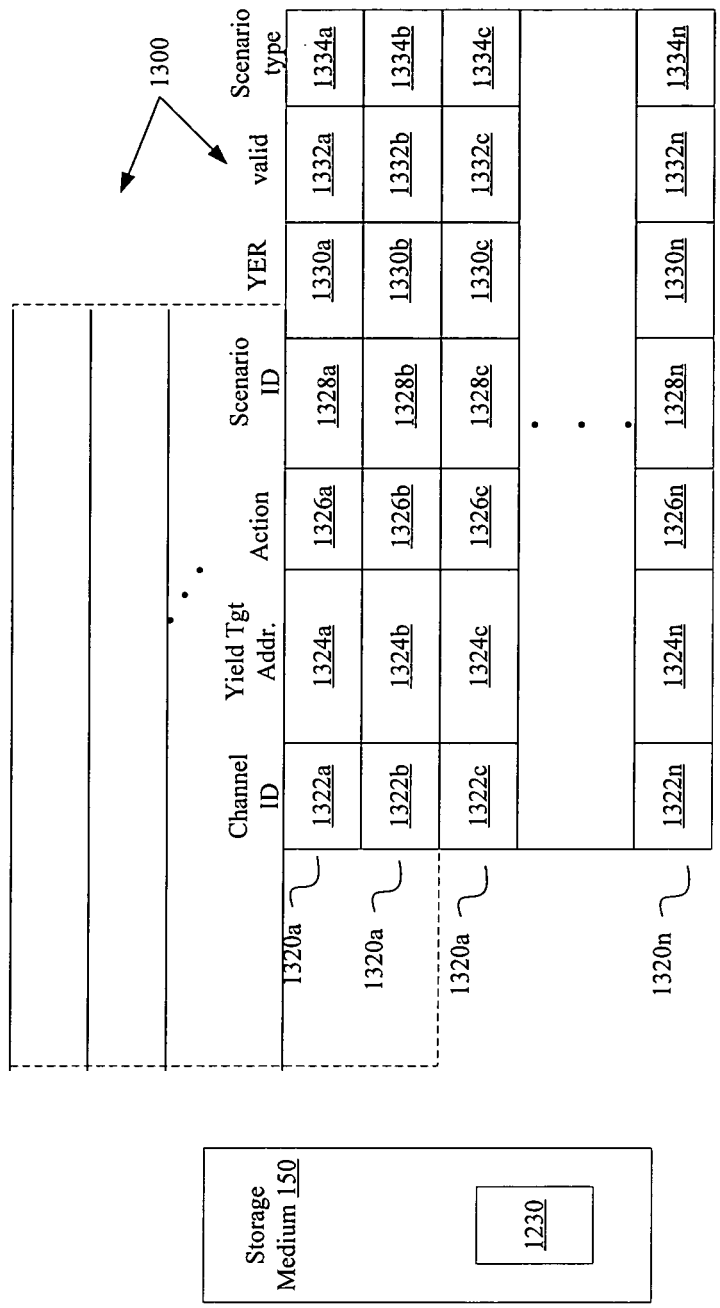
FIG. 12 is a block diagram illustrating certain details for at least one embodiment of a system that can detect and respond to architecturally-defined processing conditions of execution resources.

FIG. 12 illustrates further detail for the channels 1300, as illustrated in FIG. 1, for at least one embodiment of a system that can detect and respond to architecturally-defined processing conditions of execution resources. The channels are a set of architectural states. For at least one embodiment, each channel includes a scenario identifier and occurrence-response information. The channel may also include a scenario type identifier.

For at least one embodiment, the state information for a channel may be maintained in programmable channel register 1320. The channel register 1320 may be part of a user-level architecturally-visible mechanism to map an architectural trigger condition to a handler address. Another part of the user-level architecturally-visible mechanism may be an instruction. That is, at least one embodiment of a system 1200 that includes the channel registers 1320 may support an architectural instruction that provides for programming (by, for example, an instruction in a user-level program) the contents of the channel registers 1320. Such an instruction may be referred to herein as an EMONITOR instruction.

FIG. 12 illustrates that the state information for the channels 1300 may be maintained in one or more channel registers 1320. For at least one embodiment, only one set of channel registers 1320 is utilized. For other embodiments, additional channel registers may be utilized. The optional nature of additional channels 1300 is denoted in FIG. 12 with broken lines.

For example, a first set of channel registers 1320 may be utilized to map yield events for one level of privilege (such as ring 0 operations) and a second set of channel registers 1320 may be utilized to map yield events for another level of privilege (such as ring 3 operations). In this manner, transition to particular service threads may be identified for particular service levels.

For at least one embodiment, each channel register 1320 may be utilized to specify an architecturally-defined event or set of conditions. The event or set of conditions may be referred to as a scenario. The event or set of conditions may be architectural, microarchitectural, or a combination of both. The channel registers 1320 may be further utilized to map a target yield address to the specified scenario. The scenario may be identified by placing values in the "scenario ID" field 1328 and the "scenario type field" 1334 of the register 1320. For at least one embodiment, each register 1320 includes a scenario ID field 1328 and a scenario type field 1334. The scenario id field 1328 and scenario type field 1334 may be modified (via execution of an EMONITOR instruction, for instance) to hold a value that represents an architecturally defined scenario and to indicate whether that scenario is a fault-like scenario or a trap-like scenario.

A scenario may be used on all channels simultaneously. In other words, the same scenario can be programmed on more than one channel at a time. Each time a scenario is configured to a channel, it is instantiated once. All instances of the scenario execute independently of each other. For example, the "instruction retired counter underflow" (IR-LBR) (see scenario 3 in Table 1, below) scenario can be configured on both channel 0 and channel 1 at the same time. The counter of the IR-LBR instance configured on channel 0 may be set, for instance, to 500 k by the main thread program. Similarly, the counter of the IR-LBR instance configured on channel 1 may be set by the main program to a different number, such as 100 k. For such example, channel 1 may generate a yield event request after 100 k instruction are retired while Channel 0 may generate a yield event request after 500 k instructions are retired.

A scenario is a Boolean expression of selected architectural and/or microarchitectural conditions that can occur during execution. Examples include the retirement of an instruction, or a long-latency cache miss. Satisfaction of the scenario conditions may cause a counter to increment or decrement and/or may lead to setting of a value in the YER field 1330 (discussed below). A scenario may include a single processor event (see, e.g., Scenario Identifier 1 in Table 1, below). Alternatively, a scenario may be a composite of two or more raw events (see, e.g., sample Scenario Identifiers 0 and 2 in Table 1, below). For at least one embodiment, the scenario may be a Boolean expression of two or more raw events. An example of some example scenarios that may be architecturally defined for a system, such as, e.g., the sample system illustrated in FIG. 1, are set forth in Table 1, below. Such examples should in no way be taken to be limiting and are provided by way of example only. Alternative embodiments could, of course, implement in the channel register a bit mask that allows the user to define a user-defined set of raw events as a triggering scenario for a channel.

TABLE 1

| Scenario Identifier | Boolean Definition |
| --- | --- |
| 0 | Last level cache miss AND pipeline stall |
| 1 | Address match for interconnect (bus or point-to-point) |
| 2 | Last level cache miss AND cache miss counter overflow |
| 3 | Instruction retired counter overflow |
| 4 | Retired branch counter overflow |
| 5 | Fault-type load miss in last level cache AND early data ready |
| 6 | Unhalted core clocks |
| 7 | LD instruction retired with linear address, latency, data source |

Table 1 illustrates that certain of the scenarios may be defined as composite Boolean expressions, such as scenarios 0, 2, 3, 4, 5, 6 and 7. For scenario 0 illustrated in Table 1, the scenario includes a last level cache miss and a pipeline stall. For such scenario, it is desired that disruption of a main thread be triggered when a pipeline stall is experienced as a result of a cache miss. Similarly, scenario 2 illustrated in Table 1 may be defined as a last level cache miss and overflow of a cache miss counter. For such scenario, disruption of processing is triggered only after a predetermined number of cache misses has been experienced. Scenario 6 illustrated in Table 1 may be satisfied when a clock tick has occurred at core frequency and the processor was not halted when the clock tick occurred. Scenario 7 illustrated in Table 1 may be satisfied when an architectural load instruction retires and the latency of the load instruction met or exceeded a specified threshold.

Table 1 illustrates that scenarios 3 and 4 may also be defined as a single conceptual raw event. Specifically, scenario 3 may be defined as overflow of a counter that tracks the number of retired instructions while scenario 4 may be defined as overflow of a counter that tracks the number of retired branch instructions. For such scenarios, disruption of processing is triggered when the retirement counter indicates that the desired number of instructions has been retired. Such scenario may be useful for performance monitoring processing. For scenarios 3 and 4, the number of instructions whose retirement satisfies the scenario condition may be programmable. Thus, scenarios 3 and 4 may be implemented as a composite of microarchitectural events: an [branch] instruction is retired and the number of retired [branch] instructions has met the threshold value (see "sample after value", below).

Scenario 5 illustrated in Table 1 may be defined as a single conceptual raw event—a last level cache miss for an architectural load instruction. For such scenario, the machine doesn't wait for the data to return before the yield event is taken. This creates an opportunity to get other useful work accomplished in the shadow of the last-level-cache ("LLC") miss. Again, although scenario 5 is conceptually a single raw event, it may be implemented as a composite of microarchitectural events: a load miss occurs and it has occurred early enough in the pipeline to qualify it for a yield event.

Table 1 also illustrates that scenarios may be architecturally defined as a single raw microarchitectural event. For example, scenario 1 illustrated in Table 1 is defined as a single raw event. That is, scenario 1 is defined as a match for interconnect address. For such scenario, disruption of processing may be triggered when the address of the processor (see, e.g., 100 of FIG. 1) matches the address for a communication packet this is received from another processing element of the system. The address may be received over, for example, a multi-drop bus or a point-to-point interconnect (not shown).

Accordingly, the channel register 1320 may include an additional optional field (not shown) whose value identifies scenario-specific information. Such scenario-specific information may include, for example, a count value after which to trigger (also called sample after value). Regarding a sample after value, the conditions for taking a yield event may include counting and the consequent setting of a counter, such as an underflow or overflow counter, which can be set either by the down-counting from a user-specified sample-after value, or by pre-setting the Underflow bit by the user.

For instance, some scenarios, such as profile-guided optimization (PGO) scenarios, may use a counter to determine when to set the yield event request bit.

Other examples of scenario-specific information that may be included in an optional field of the channel register 1320 include a threshold value, and/or a linear address. For example, snoop-related scenarios may hold a linear address as part of their scenario-specific state. Of course, other additional state information not specifically enumerated herein may also be specified by an EMONITOR instruction for the optional scenario-specific information field for a particular channel register 1320.

Table 1 above illustrates a monolithic numbering scheme in which all scenarios are numbered linearly. For such embodiment, the type of scenario (fault-like v. trap-like) is implied by the scenario number. However, for an alternative embodiment, the scenario ID space may be partitioned between fault-like scenarios and trap-like scenarios, with numbering in each space beginning at zero. For such embodiment, two or more scenarios may be associated with a single scenario identifier value. For such cases, a scenario type value (not illustrated in Table 1) may be utilized to distinguish among scenarios having the same scenario identifier value. For at least one embodiment, the scenario type value indicates whether the scenario is a trap-like scenario or a fault-like scenario. Based on this value, hardware may signal whether a fault-like yield or a trap-like yield event should be delivered for a channel.

FIG. 12 illustrates that each register 1320 also includes a "yield target address" field 1324. Again, a value for the yield target address field 1324 may be programmed into the channel register 1320 via execution of the EMONITOR instruction. For at least one embodiment, the value placed into the yield target address field by the EMONITOR instruction is referred to herein as a "thread yield EIP." For at least one embodiment, the thread yield EIP represents an offset into the current code segment.

The current code segment, for purposes of this discussion, may be the code segment indicated by a register such as a code segment ("CS") register. The offset represented by the yield EIP may represent an offset from the beginning of the code segment to the first instruction of the selected service thread or event handler that is to be executed when the conditions of the indicated scenario are met. Of course, one of skill in the art will recognize that the thread yield EIP value placed into the yield target address field 1324 of a channel register 1320 may, instead, be any other value that indicates a starting address, including an address value or a pointer.

The yield target address field 1324 is optional for at least one embodiment of the system 1200 illustrated in FIG. 12. For one embodiment, for example, the thread yield EIP is maintained in a memory structure, such as a user stack.

FIG. 12 illustrates that each channel register 1320 may also include other, optional, fields. These optional fields may include a channel identifier field 1322, a action field 1326, a yield event request ("YER") field 1330, and a valid field 1332. One of skill in the art will recognize that these optional fields 1322, 1326, 1330 and 1332 are provided for illustrative purposes only and should not be taken to be limiting. For other embodiments, fewer fields, or different fields, may be defined in the channel registers 1320.

For the embodiment illustrated in FIG. 12, the optional channel identifier field 1322 may be utilized to identify the channel register 1320. For at least one embodiment, the values for the channel identifier field 1322 numbers may not be unique among all channel registers. For example, for an embodiment that maintains one set of channel registers for one privilege level, and another set of channel registers for another privilege level, the channel identifiers may be repeated among the sets. For example, one set of channel registers 0-3 may be allocated for ring 3 operations while another set of channel registers 0-3 may be allocated for ring 0 operations.

The channels may thus be associated with ring levels. Each channel is assigned to a ring level and can only be used in this ring level. Although only four channels are illustrated in FIG. 12 for each ring level, such illustration should not be taken to be limiting. Any number of channels may be supported for each ring level, and each ring level need not necessarily be allocated the same number of channels as other ring levels. For at least one embodiment, each ring level can have up to 256 channels which are indexed from 0 to 255. The channel identifier, also called a channel index, for such embodiment may be encoded in an 8-bit space; the channel identifier field 1322 may thus be an 8-bit field.

The optional action field 1326 may be utilized as follows. The value of the action field 1326 indicates the type of action that should be taken when the scenario identified in the channel register's scenario identifier field 1328 occurs. For at least one embodiment, the action field 1326 is a four-bit field that can therefore encode up to 16 action types. For at least one embodiment, the valid action type values for the action field 1326 may include a yield action value and a status bit update value. If the action field 1326 includes the yield action value, then the following action will be taken: when the YER field for the channel is set (see discussion of YER field 1330, below), a yield event will occur such that control flow will be transferred to the instruction indicated in the yield target address field 1324.

If the action field 1326 includes the status bit update value, then the channel is in "silent" mode, and no yields will be taken by the channel. That is, when the specified scenario for the channel occurs, a yield event will not occur. Instead, certain specified status bits are updated. For example, the value of the YER field 1330 may be updated.

The value in the optional YER field 1330 may be utilized to indicate whether the triggering condition defined by the scenario has occurred, along with any other conditions required by the scenario, such as a counter underflow and precision constraints. For at least one embodiment, the YER field 1330 may be a one-bit field.

The value of the YER field 1330 may be set by the processor when a triggering condition, and any other required conditions, for a scenario have been met. However, the yield event request bit can be defined to be set only if the privilege level at which the triggering condition is detected matches the channel's privilege level, or if the privilege level at which the triggering condition is detected is greater than or equal to the channel's privilege level.

For at least one embodiment, the YER value may be cleared by the processor when that channel's yield event successfully transfers control to the designated yield target address. If the YER bit is set but the yield event cannot be serviced, and an additional triggering condition occurs, a counter may record the additional triggering condition while the YER bit remains set. For at least one embodiment, the clearing of the YER value and/or the recordation of additional triggering conditions may be performed by an event handler mechanism. In this manner, a yield event may be pended until it can be serviced.

The YER value 1330 may be useful for an embodiment that allows triggering scenarios to be serviced as either a fault-like yield event or as a trap-like yield event. For at least one embodiment, trap-like yield events are only signaled on an interrupt or trap boundary. In contrast, fault-like yield events may be signaled in the middle of an instruction, for at least one embodiment. That is, some scenarios may fault as soon as the instruction or micro-operation for which the triggering condition is recognized is eligible for retirement, such as faulting on a load that has a longest-latency cache miss. The value in the YER field 1330 thus may be set to indicate a fault-like yield that is to be serviced right away. (For at least one embodiment, the value of the YER field 1330 is set by hardware.)

Faulting may enable work to be accomplished in the shadow of an LLC miss. This type of value in the YER field 1330 may be set, for example, when the yield event is intended to trigger a service thread whose concurrent execution with a main thread is intended to clear up a condition that would otherwise cause the main thread to stall or perform poorly. The service thread may thus perform processing in the "shadow" of the event defined by the scenario that triggered the yield event. This allows the service thread to perform its processing as if the faulting instruction has not occurred at all, in parallel with the main thread processing.

For example, when a load misses in the last-level on-die cache (LLC), the data must be fetched from off-die memory (such as DRAM), which may take many cycles. During the time that the load data is being retrieved from memory, the processor pipeline is stalled, doing no useful work. This situation is sometimes referred to as the "memory wall problem".

The use of helper threads is one technique to deal with the memory wall problem. To implement helper threads, a software program may include code to create helper threads for regions of the software program that are predicted to incur relatively frequent LLC misses. When an LLC miss occurs in the selected region, the corresponding helper thread may be invoked to do some useful work in the shadow of LLC misses (while the pipeline is stalled to fetch the data).

To enable this usage model, embodiments of the present invention include hardware to detect the condition that a load misses LLC and then deliver a yield event to invoke the helper thread before the data comes back from memory. For at least one embodiment, the yield event is signaled and the load instruction is canceled before it is retired. Thus the processor is restored back to the state as if the yield event did not occur. This kind of yield is called as fault-like yield and the corresponding triggering condition (e.g., load missing in the LLC) is called fault-like scenario When the yield event is delivered, the processor states look to the software like the faulting instruction has not yet been executed. For example, consider a load instruction (LD) that is to update the value of a register, R1. Consider, for purposes of example, that a channel has been programmed to perform a fault-like yield event (based on value of the scenario id) when the load instruction yield event occurs and that an architectural scenario has been identified for a faulting load instruction, and that the scenario identifier field 1328 value specifies this scenario. At the time that software is handling the yield event, the event handler does not see any update to R1 based on operation of the LD instruction.

In contrast, trap-like scenarios are able to record and report the results of executing the instruction. Such scenarios are useful when it is desired that the trapping instruction complete execution before the yield event processing is performed. By setting the value of the YER field 1330 to an appropriate value, a trap-like yield event may be indicated. The YER value 1330 may be set to a value that is used to "pend" the fault-type yield until an interrupt boundary. Such type of event may be useful, for example, when the event handler is to perform performance monitoring. In such case, it may be desirable for the trapping instruction to complete execution before processing performance monitoring information based on execution of the instruction. A trap-like yield event thus appears to a programmer as if the trapping instruction has already been retired.

Accordingly, a yield event that is programmed in a channel register 1320 will be signaled as a fault-like event or trap-like event, depending on which scenario type has been selected. As indicated above, the valid values for a scenario id may be partitioned and allocated among trap-like scenarios and fault-like scenarios. Thus, a scenario id for a trap-like scenario may be allocated a particular value while the same value may indicate a different fault-like scenario. Accordingly, the bits of the EMONITOR instruction may include not only a scenario identifier value, but may also include a bit to indicate whether the scenario is a trap-like scenario or a fault-like scenario.

As is explained above, even if the values of a channel register 1320 have been programmed to indicate that a yield event should be processed upon occurrence of a scenario, such yield event will not be taken if the blocking indicator 1380 for the ring level associated with the channel register 1320 indicates that yield events should be blocked.

For at least one embodiment, multiple channels can be used simultaneously, but only one channel's yield event can be serviced at a time. That is, if multiple yield events occur simultaneously, the processor selections the highest priority event for servicing. Such selection may be performed, by at least one embodiment, by an event handler mechanism.

The process of invoking the service routine when servicing a yield event may include setting the yield blocking indicator 1380 and clearing the value of the yield event request field 1330 for the highest-priority channel, whose service routine is invoked by a yield event. Again, the clearing of the YER field 1330 may be performed by an event handler mechanism. The clearing of the blocking indicator 1380 may be performed by execution of an ERET instruction at the end of the service routine.

In addition, the process of delivering a yield event may also involve saving a return address (the address of the next instruction following the interrupted point), a channel identifier, and at least a subset of flag values. These values may be saved by pushing them onto a stack.

As is explained below in connection with the ERET instruction, the return address may be saved on a stack or in a register. Of course, one of skill in the art will recognize that an instruction address may be saved in any format and need not necessarily be an absolute address value. For at least one embodiment, for example, the address may be saved in the form of an offset value.

By pushing the channel id onto the stack when a yield event is delivered, software is permitted to handle prioritization at the software level when multiple fault-like scenarios are triggered. Such prioritization may be handled, for at least one embodiment, in the following manner.

As is explained above, if fault-like scenarios in multiple channels are triggered on the same dynamic instance of an architecture operation, all of these channels' YER bits may be set. The YER bit for a given channel is cleared when the yield transition occurs for that channel.

In the case that multiple fault-like yield events have been pended via setting of the YER bit for multiple channels, the highest priority channel will be serviced right away, meaning that a fault-like yield is signaled right away, if the yield is not blocked (see old para. 129, below). A fault-like yield delivered in this manner disrupts the execution of the instruction and restores the processor state prior to the execution of the instruction that triggered the fault-like yield event.

The lower priority channels that have YER bit set will be serviced when yield is unblocked. These fault-like yields are delivered at an interrupt/trap boundary. This allows all channels to be serviced in channel priority order for multiple pending fault-like yield events.

The flag values that are saved when a yield event is delivered may be all or a subset of those values that are maintained in a flag register. For at least one embodiment, all flag values in an EFLAGS register are saved onto a stack when the yield event is delivered. These flags may be one- or two-bit values and may include carry (CF), parity (PF), auxiliary carry (AF), zero (ZF), sign (SF), trap (TF), interrupt enable/disable (IF), direction (DF), overflow (OF), I/O privilege level (IOPL), nested task (NT), resume (RF), virtual 8086 mode (VM), alignment check (AC), virtual interrupt (VIF), virtual interrupt pending (FIP), and CPU identifier (ID) flags and the like. Six of these flags are referred to herein as "arithmetic flags": CF, PF AF, ZF, SF and OF. Of course, the preceding listing of specific flags is intended to be illustrative only; other embodiments may include fewer, more, or different flags.

In addition to pushing the flag values onto the stack when a yield event is delivered, at least one embodiment may also modify one or more flag values in certain situations. For example, for at least one embodiment, the current processor value of the resume flag (RF) and trap flag (TF) are cleared when a yield event is delivered. For at least one embodiment, other processor values of the EFLAGS flags are not modified upon yield event delivery.

The RF and TF flags are system flags. Clearing the processor value of the RF flag for a yield event allows a code breakpoint for the first instruction in the yield event handler code. Clearing the processor value of the TF flag for a yield event avoids single stepping into an asynchronous yield event handler.

In addition, the copy of the RF flag that is saved on the stack is modified for fault-like yields. (For at least one embodiment, the stack value of the RF flag is not modified when a trap-like yield is delivered.) For fault-like yields, the stack value of the RF flag is set to a value that indicates that single-step may only occur once per instance of an instruction, thereby suppressing repeating exceptions to the same instruction instance. For at least one embodiment, when the RF flag is set the processor ignores instruction breakpoints. This prevents looping on an instruction breakpoint due to a yield and ensures one code break per dynamic instruction. By setting the stack value of the RF flag to ignore breakpoints, the value will be popped from the stack into the EFLAGS register after completion of the yield event service routine. The processor will then ignore instruction breakpoints for the duration of the next instruction.

Regarding priority, a priority may be established among channels, since the YER bit may be set for the same uop or instruction for multiple fault-like scenarios or trap-like scenarios, respectively, at the same privilege level. (Yield events are only taken for channels associated with the current privilege level). In addition, multiple channels with fault-like scenarios may trigger on the same dynamic instance of an instruction. If multiple channels with fault-like scenarios trigger on the same dynamic instance of an architectural operation, then it is desirable for all of them to be serviced in proper order Whenever there is an opportunity to take a yield, the highest-priority channel for which the YER bit is set and for which the channel action field is set is serviced first. For at least one embodiment, the highest-priority channel is the lowest-indexed channel with a pending yield event request. As that yield is taken, the YER bit is cleared for that channel. Other channels' YER bits remain set, and they are serviced at the next window for taking yields, if their conditions for taking a yield event still hold (i.e., when the yield block bit is clear, the YER bit is still set, etc.). In this manner, each channel's pending yield event is serviced in turn, with a fixed, predictable ordering.

If fault-like scenarios in multiple channels are triggered on the same dynamic instance of an operation, all of these channel's YER bits will be set. Again, however, the YER bit is not set if a yield event is blocked. A fault-like yield may be blocked (and therefore cannot be delivered) in any one or more of the following is true:

the thread-specific yield block bit for the ring level is set; or
interrupts are disabled (the IF flag is 0); or
a freeze bit is set to indicate that yield events are globally disabled for the system; or
NMI is inhibited; or
either the MOV/POP SS blocking or the STI blocking is active; or
the channel action field is not "yield"; or
TPR is not zero; or
CR0.TS=1; or
Logical processor is shut down.

If a fault-like scenario causes the YER bit to be set, the fault-like scenario may be delivered right away unless it is deferred. If deferred, the fault-like scenario is delivered at an instruction/trap boundary. If the fault-like yield was blocked due to any of the conditions listed above, the instance is not dropped. If the scenario is a sample after value type of scenario, the counting may be performed for the instance even when yielding is suppressed. For a precise fault-like scenario, if fault-like yields are blocked then the YER bit will not be set.

A dynamic instance of an executing instruction can potentially trigger yield events in multiple channels, and in that case, they will all be serviced. The order in which they will be serviced is "channel priority order" i.e. channel number zero is first, channel one is second and so on.

The various agents that use the channels can be coordinated at the application level in run time. To enable this software coordination, both trap-like and fault-like yield transitions push the channel ID onto the stack to enable the application to manage which channel serves which agents. In this manner, the channel priority may be managed by software to match the priority that the application assigned to each agent.

Pushing the channel ID allows a service routine to discover what channel it is currently programmed into so it can be reprogrammed during the course of the service routine. This, in turn, allows a scenario to be moved from one channel to another without communicating the move to the software entity that originally programmed the scenario.

Accordingly, for at least one embodiment, a software-implemented resource manager can utilize dynamic channel migration to manage channel priority. Dynamic channel migration creates discontinuity between the initial programming of channels and the subsequent behavior. Upon a yield event, the yield event handler needs to know which channel caused the event in order to collect data or reprogram that channel. This is accomplished by the channel ID pushed onto the stack. Software removes the channel ID entry from the stack before executing an ERET instruction at the end of the yield event handler code. Accordingly, the ERET instruction does not pop the channel ID off the stack, since the channel ID is removed by software before the ERET instruction is executed.

In the manner described immediately above, the software may map the channel priority to a scenario priority by selecting the best channel based on its own service routine behavior. The yield handler may utilize the channel id from the stack to access the channel in order to perform this channel migration.

On the topic of prioritization, it should be noted that yield events may be prioritized among other processor events (such as traps and exceptions). For at least one embodiment, this may be accomplished via a priority table. An example of a priority table is set forth below in Table 2. One of skill in the art will understand that other embodiments may include different processor events. Table 2 is set forth below merely for purposes of example.

Table 2 illustrates that a yield event may be prioritized as lower level priority than interrupts. A trap-like yield event may be prioritized lower than external interrupts but higher than a code breakpoint of the next instruction. A fault-like yield event may be prioritized as the lowest-priority fault that can occur while executing an instruction:

TABLE 2

1. (Highest) Hardware Reset and Machine Checks
  RESET
  Machine Check
2. Trap on Task Switch
  T flag in TSS is set TABLE 2-continued 3. External Hardware Interventions
    FLUSH (may not exist for all implementations)
    STOPCLK
    SMI
    INIT
4. Traps on the Previous Instruction (different than trap-like yields)
    Breakpoints
    Debug Trap Exceptions (TF flag set or data/I-O breakpoint)
    VM exits due to monitor trap flag
5. External Interrupts
    VM exits due to NMI-window exiting (NMIP)
    Non-maskable interrupts
    VM exits due to interrupt-window exiting (VMXIP)
    Maskable HW Interrupts
    GP Trap (Virtual interrupts)
    Trap-like yields and deferred fault-like yields
6. Code Breakpoint Fault
7. Faults from Fetching Next Instruction
    Code-Segment Limit Violation
    Code Page Fault
8. Faults from Decoding Next Instruction
    Instruction length > 15 bytes
    Invalid Opcode
    Coprocessor Not Available (DNA)
    Forced DNA, for the sake of channel restoration
9. (Lowest) Faults on Executing an Instruction
    Overflow
    Bound error
    Invalid TSS
    Segment Not Present
    Stack fault
    General Protection
    Data Page Fault
    Alignment Check
    x87 FPU Floating-point exception
    SIMD floating-point exception
    Fault-like yields FIG. 12 illustrates that a channel register 1320 may also include a valid field 1322. The value of the valid field 1322 indicates whether the register 1320 contains valid data. For at least one embodiment, the valid field 1322 is a one-bit field. For such embodiment, the channel is valid when the value in this field is set. The channel is invalid when the value of the one-bit field 1322 is cleared. When the channel valid bit is clear, all of the other channel state is invalid, and will be read as 0. (See discussion, below, of EREAD instruction for reading the contents of a channel register).

Similarly, at least one embodiment of the system 1200 may also support an architectural instruction that provides for reading the contents of a channel register 1320. Such an instruction may be referred to herein as an EREAD instruction.

FIG. 12 illustrates that a storage medium 150 may include an operating system 1230. For at least one embodiment, the operating system 1230 may provide context management functionality, such as context save and restore services, for channel state when a context switch.

In addition to an EMONITOR instruction that may program the various fields of the channel register 1220 as discussed above, the system illustrated in FIG. 12 may also provide an architectural instruction that provides for an instruction in a user program to query the contents of a channel register 1202. At least one embodiment of such an instruction is referred to herein as an EREAD instruction. In addition, the system illustrated in FIG. 12 may also provide an architectural instruction that returns control to a main thread after a yield event has been delivered. Such instruction is referred to herein as an ERET instruction.

In addition, the system illustrated in FIG. 12 may also provide user-level instructions to read or manipulate channel state. These additional instructions may include an ECRB instruction to read the yield event block bit and other cross-channel state, an ECWR instruction to write the yield event block bit and other cross-channel state, and an ESTATUS instruction to read the YER bit for a specified channel.

Certain details for the EMONITOR, EREAD, ERET, ECRD, ECWR, and ESTATUS instructions are set forth generally below in Table 3. In addition, further detail for each of the instruction is set forth in the discussion following Table 3, below. One of skill in the art will recognize the specific opcodes, register names and field bit lengths and values are provided for illustrative purposes only and should not be taken to be limiting. Other opcodes, field lengths, field values, and register names may be utilized without departing from the scope of the appended claims.

TABLE 3

| Instruction | Description |
| --- | --- |
| EMONITOR | Programs a channel with data in ECX, EBX, EAX, EDX |
| EREAD | Reads a specified channel and returns the data in ECX, EBX, EAX, EDX |
| ERET | Yield interrupt return. |
| ECRD | Reads the yield event block bit for the ring level specified in ECX |
| ECWR | Writes the yield event block bit for the ring level specified in ECX |
| ESTATUS | Reads the YER bit for the specified channel |

EMONITOR—

Set up channels. EMONITOR takes inputs from registers (referred to as ECX, EBX, EAX, and EDX below) to program a channel.

ECX.

ECX[7:0] contains scenario ID, 0 to 255;

ECX[8] contains scenario type
   0 means trap-like scenario
   1 means fault-like scenario ECX[12:9] contains channel action encoding
   0 means no action;
   1 means call yield event;
   values of 2 to 15 are reserved for this field; The MaxAction field of CPUID leaf 7 specifies the maximum allowable value for this field.

ECX[13] contains yield event request.

ECX[15:14] contains ring level.

ECX[23:16] contains channel ID, 0 to 255.

ECX[24] contains channel valid bit

Other bits are reserved to zero. Non-zero values in any reserved bit may cause the instruction to fault. In addition, a general purpose fault may be triggered for an unsupported combination of scenario ID plus scenario type.

The value in ECX[23:14] specifies the channel to be programmed by the EMONITOR instruction. It should be noted that the EMONITOR instruction may be implemented to allow higher priority code to access channels that have been allocated for lower priority code. Accordingly, ring 0 code may be permitted to access ring 3 channels. Therefore the channel selection needs to take ring level into account (e.g., ECX[15:14]). However, ring 3 code cannot access the channels that belong to ring 0. If ring 3 code executes this instruction with ring level specification in ECX[15:14]=0, the instruction may cause a general purpose fault.

EBX contains the YIELD_TARGET_EIP. The EMONITOR instruction thus sets the value in the yield target address field 1324 of the specified channel with the address specified in EBX.

EAX communicates additional scenario-specific information to the instruction. The scenario definition specifies what additional information is required to be provided to set up a channel properly to monitor the scenario. EAX can contain the additional data to be loaded or can be a pointer to a memory buffer from which additional data is loaded. The use of EAX is scenario specific. EAX is ignored if the specified scenario does not have any additional states defined.

EDX communicates additional hints to the instruction and will not change the architectural behavior of the instruction. EDX is reserved as 0 if the specified scenario does not have any hints defined.

EREAD—Read channel. The EREAD instruction does the reverse operation of the EMONITOR instruction. It reads the channel specified in ECX [23:14] at the ring specified in ECX[15:14] and returns the data into ECX, EBX, EAX, and EDX. As with the EMONITOR instruction, EAX can contain a pointer to a memory region into which EREAD stores the additional channel scenario specific data. Some scenarios do not have any additional data. Therefore, EAX is not used for those scenarios EREAD may utilize the following fields of ECX as input parameters:
    ECX[7:0] contains the scenario ID, 0 to 255.
        ignored if ECX[8]=0
    ECX[8] contains the scenario type bit.
        1 means fault-like scenario
        0 means trap-like scenario
        ignored if ECX[25]=0
    ECX[15:14] contains the ring level.
    ECX[23:16] contains the channel ID, 0 to 255.
    ECX[25] contains the Match scenario bit.
        1 requires that the scenario-specific side effects for non-channel state to occur iff the value in the channel scenario ID field matches ECX[8:0].
        0 requires that such scenario-specific side effects do not occur, regardless of the channel's scenario ID field, i.e. ECX[8:0] is ignored and the canonicality check on EAX is not performed.
    Other bits are reserved to zero. Non-zero values in these bits causes the instruction to GP fault.

For EREAD, the use of EAX to hold a parameter for the instruction is scenario specific. EAX may be used to specify a valid memory pointer to a memory region into which the scenario specific data can be stored upon EREAD. For scenarios dumping out no additional data, EAX may be ignored by the EREAD instruction. For at least one embodiment of the EREAD instruction, EBX and EDX are not utilized.

The layout of states returned by EREAD is as follows (which corresponds to the input format defined for EMONITOR, discussed above):
ECX
    ECX[7:0]←scenario ID in channel, 0 to 255.
    ECX[8]←scenario type bit.
    ECX[12:9]←channel action.
    ECX[13]←yield event request.
    ECX[15:14]←ring level (unchanged from input)
    ECX[23:16]←channel ID, 0 to 255, (unchanged from input)
    ECX[24]←channel valid bit.
    ECX[25]←0
    Other bits of ECX contain 0 for at least one embodiment.

EBX may contain the yield target address. EDX may contain additional hints associated with the channel. EDX is read as 0 if the specified scenario does not have any hints defined.

[EAX] contains additional scenario-specific data, if there is any. For example, the current EIP value and LBR are dumped into the memory buffer pointed to by [EAX] for the "retired instruction counter underflow" scenario.

EAX contains the additional scenario-specific data that EMONITOR specifies in EAX to program the scenario logic. For example, the current counter value is returned in EAX for scenarios that support a counter. EAX is unchanged if the specified scenario does not have any additional states to be returned in EAX.

If the channel is invalid, as indicated by the value in the valid field 1332, all registers (EAX, EBX, ECX, EDX) are read as 0, except for ECX[23:14].

ECRD—Read the yield event block bit or other cross-channel state element indicated by an index. ECRD may utilize the following fields of ECX as input parameters.
    ECX.
    ECX[11:0] contains index;
    ECX[15:14] contains ring level;
    Other bits are reserved to zero. Non-zero values in any reserved bit may cause the instruction to fault.

The yield event block bit is not channel specific; there is one yield event block bit (YBB) per ring. Other state elements, such as freeze bit or an instruction pointer, may also be shared across channels.

The value in ECX[15:14] specifies the privilege level for which it is desired that the YBB bit or other cross-channel state element be read. The ECRD instruction, may, for at least one embodiment, read the indicated state element belonging to any ring level that is the same or lower than the current privilege level. That is, ring 0 code may be permitted to read channel state for ring 3 channels. However, ring 3 code cannot access the channel state that belongs to ring 0. If ring 3 code executes this instruction with ring level specification in ECX[15:14]=0, the instruction may cause a general purpose fault.

The indicated cross-channel state element for the specified ring level is returned in EAX, where all bits beyond the field size of the context state element are 0

ECWR—Write the yield event block bit or other cross-channel state element. ECWR sets the cross-channel state element specified by the index in ECX[11:0], for the ring level specified in ECX[15:14], to value in EAX. ECWR may utilize the following fields of ECX as input parameters.
    ECX.
    ECX[11:0] contains index;
    ECX[15:14] contains ring level;
    Other bits are reserved to zero. Non-zero values in any reserved bit may cause the instruction to fault The value in ECX[15:14] specifies the privilege level for which it is desired that the YBB bit or other cross-channel state element be written. For at least one embodiment, the specified state element for the specified ring level is set to the value in EAX. EAX is therefore also used as an input to the ECWR instruction.

ESTATUS—Read the yield event request (YER) bit for the specified channel. ESTATUS may utilize the following fields of ECX as input parameters.
    ECX.
    ECX[15:14] contains ring level;
    ECX[23:16] contains channel ID.
    Other bits are reserved to zero. Non-zero values in any reserved bit may cause the instruction to fault The ESTATUS instruction may read the yield event request bit for the channel indicated in EXC[23:16]. The YER bit value is returned in ECX[0]. The value of the yield event request bit for the specified channel may be returned in a general register, such as ECX, or, for at least one embodiment, may be returned in a flag register such as EFLAGS.ZF ERET—Yield interrupt return. For at least one embodiment, user-level event handling triggered by satisfaction of trigger conditions in a channel is performed as an atomic block with respect to receiving another yield event. When a yield event occurs, a yield event handler mechanism may set a value in a yield block indicator (see, e.g., 1380, FIG. 1) to prohibit further yield events and therefore enforce atomicity. The ERET instruction unblocks the yield event (by clearing the yield block indicator) to re-enable yield events. The ERET instruction is used by the channel's service routine to return to the continuation point. The ERET instruction thus transfers the program control back to a return address.

For fault-like yield events, after successful delivery of the event the corresponding channel service routine transfers control back to the disrupted code, which will re-execute the instruction that caused the fault-like yield. The mechanism to accomplish the control transfer may be an ERET instruction at the end of the channel service routine.

Accordingly, the ERET instruction obtains the return address as part of its operation. For at least one embodiment, the ERET instruction pops the top of stack into the EIP register. Such embodiment assumes that, when a yield event is delivered, a return address is pushed onto the stack. Alternatively, the ERET instruction may obtain the return address from a register. Again, for such embodiment it is assumed that the return address (e.g., the address of the next instruction following the interrupted point) was placed into the register before the yield event was delivered. In either case, for at least one embodiment the return address is saved (either in a register or on the stack) by a yield event mechanism.

For at least one embodiment, the ERET instruction also restores the contents of the processor EFLAGS register using the saved EFLAGS values that were saved when the yield event was delivered. For at least one embodiment, only a subset of the EFLAGS values is modified during this restoration. For example, one embodiment restores only the values of the six arithmetic flags mentioned above (CF, PF AF, ZF, SF and OF) and also restores the following system flags (RF, TF, ID, DF, NT, AC) but leaves the remaining EFLAGS values unmodified from those currently maintained by the processor. The unmodified flag values may include IOPL, VIF, VIP, VM, IF and reserved bits. This restoration of the EFLAGS values during execution of the ERET instruction occurs, for at least one embodiment, when returning from both trap-like and fault-like yield events.

When the faulting instruction for a fault-like yield is re-executed after control is transferred back to the disrupted code, it is possible that the fault-like scenario will be re-encountered and may again trigger a fault-like yield event. This feature may be desirable for some usage models, but undesirable for others. Thus, an embodiment that blocks such repetitive faults (via a hardware embodiment, e.g., where the ERET instruction blocks fault-like scenarios for one instruction) may not be universally desirable. Therefore, for at least one embodiment it is left up to the programmer to handle the potential for looping fault-like scenarios via the software of the channel service routine.

During development, a design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Thus, techniques for a programmable event-driven yield mechanism are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   execution resources to execute a plurality of instructions;
   a user-level mechanism to map an architectural trigger condition to a start address of a handler, wherein the user-level mechanism is to allow any program to access or manipulate a yield capability corresponding to the program, the architectural trigger condition being based on one or more events associated with the execution resources; and
   a fault-like yield mechanism to selectively disrupt processing of at least one program by transferring control to the handler in response to detecting said trigger condition, wherein said yield mechanism is further to cancel an instruction associated with the trigger condition before said instruction is retired;
   wherein said user-level mechanism further comprises one or more programmable channel registers which each include user programmable fields for: a channel identifier, a yield target address, an action, a scenario identifier to hold a value that represents an architecturally defined scenario, a yield event request, valid, and a scenario type to indicate whether a scenario is fault-like or trap like.

2. The apparatus of claim 1 wherein the fault-like yield mechanism is to push a plurality of flag values onto a stack, the plurality of stack values including a resume flag value, wherein the fault-like yield mechanism is further to set the pushed resume flag value to a value that indicates that single-step should occur only once per instruction.

3. The apparatus of claim 1 wherein the handler includes an architectural user-level return instruction to restore selected flag values into a processor flag register from a stack and to return control to the program.

4. The apparatus of claim 1, wherein the fault-like yield mechanism is further to modify one or more processor system flags in order to allow a code breakpoint for the first instruction of the handler.

5. The apparatus of claim 1 wherein fault-like yield mechanism is further to modify one or more processor system flags in order to avoid single stepping into an asynchronous yield event handler.

6. The apparatus of claim 2 wherein the plurality of flag values further include:
a plurality of arithmetic flags; and
one or more of a trap flag, resume flag, direction flag, nested task flag, and alignment check flag.

7. The apparatus of claim 3 wherein said architectural user-level return instruction is further to allow other selected flag values of the processor flag register to remain unmodified.

8. The apparatus of claim 1, wherein said fault-like yield mechanism is further to maintain processor state to appear to the handler that the instruction associated with the trigger condition has not yet been executed.

9. The apparatus of claim 1 wherein the one or more programmable channel registers include a scenario type field to hold a value to indicate a fault-like architectural trigger condition.

10. An apparatus comprising:
execution logic to execute a program;
event handler logic to invoke an event handler to cause a direct transition from one user-level program to another user-level program, wherein the event handler logic is to allow any program to access or manipulate yield capability corresponding to the program in response to a program-selectable architecturally-defined scenario of the execution logic during execution of the program, the scenario further comprising a combination of events associated with the execution logic;
one or more channel registers that are programmable by a program operative at a user privilege level, wherein each user programmable channel register includes user programmable fields for: a channel identifier, a yield target address, an action, a scenario identifier to hold a value that represents an architecturally defined scenario, a yield event request, valid, and a scenario type to indicate whether a scenario is fault-like or trap like;
wherein the event handler logic is to pend fault-like scenarios in multiple channels that are triggered on the same dynamic instance of an operation.

11. The apparatus of claim 10, further comprising a user stack area.

12. The apparatus of claim 11 wherein the event handler logic is further to push a channel identifier onto the user stack.

13. The apparatus of claim 10 further comprising:
one or more yield event blocking bits.

14. The apparatus of claim 10, wherein the value of the yield event request field may be returned by a user-level instruction.

15. The apparatus of claim 13, wherein the value of a selected yield event blocking bit may be returned by a user-level instruction.

16. The apparatus of claim 13, wherein the value of a selected yield event blocking bit may be written by a user-level instruction.

17. A system comprising:
a processor comprising a user programmable hardware monitor to detect an architecturally-defined processor condition;
said processor further comprising a user programmable channel register to specify a handler to be executed in response to the processor condition; and a storage medium to store the handler, the handler comprising at least one return instruction to relinquish control from the handler, wherein the processor is to allow any program to access or manipulate yield capability corresponding to the program, wherein each user programmable channel register includes user programmable fields for: a channel identifier, a yield target address, an action, a scenario identifier to hold a value that represents an architecturally defined scenario, a yield event request, valid, and a scenario type to indicate whether a scenario is fault-like or trap like.

18. The system of claim 17 wherein said return instruction is a user-level instruction.

19. The system of claim 17 further comprising:
handler logic to disrupt processing of a program in order to transfer control to the handler.

20. The system of claim 19, wherein the handler logic is further to transfer control to the handler without changing privilege levels.

21. The system of claim 17 further comprising a communications interface.

22. The system of claim 19, wherein the handler logic is further to transfer control to the handler, on an interrupt boundary, in response to a trap-like processor condition.

23. The system of claim 22, wherein the handler logic is further to maintain processor state so that the handler can see the result of an instruction whose execution caused the trap-like processor condition to be satisfied.

24. The system of claim 19, wherein the handler logic is further to transfer control to the handler, regardless of interrupt boundary, in response to a fault-like processor condition.

25. The system of claim 24, wherein the handler logic is further to:
cancel, before retirement, an instruction whose execution caused the fault-like processor condition to be satisfied; and
maintain processor state so that the handler does not see the results of the instruction whose execution caused the fault-like processor condition to be satisfied.

26. The apparatus of claim 10, wherein:
the transition is to be handled as either a fault-type transition or a trap-type transition, depending on the value of a scenario type indicator.

* * * * *